(12) United States Patent
Genovese et al.

(10) Patent No.: US 10,686,742 B2
(45) Date of Patent: Jun. 16, 2020

(54) ADJUSTING RECIPIENTS OF A MESSAGE

(71) Applicant: Oath Inc., New York, NY (US)

(72) Inventors: Peter John Genovese, Santa Clara, CA (US); Fang Xu, Union City, CA (US); Markandey Singh, San Jose, CA (US); Leung Wai Chan, Mountain View, CA (US); Chuan Tian Zhang, British Columbia (CA)

(73) Assignee: Oath Inc., New York, NY (US)

( * ) Notice: Subject to any disclaimer, the term of this patent is extended or adjusted under 35 U.S.C. 154(b) by 87 days.

(21) Appl. No.: 15/965,956

(22) Filed: Apr. 29, 2018

(65) Prior Publication Data

US 2019/0334847 A1 Oct. 31, 2019

(51) Int. Cl.
*H04L 12/58* (2006.01)
*G06F 3/0482* (2013.01)
*G06F 3/0484* (2013.01)
*H04L 29/12* (2006.01)

(52) U.S. Cl.
CPC ............ *H04L 51/14* (2013.01); *G06F 3/0482* (2013.01); *G06F 3/04842* (2013.01); *H04L 61/1594* (2013.01)

(58) Field of Classification Search
CPC .... G06F 3/0482; G06F 17/241; G06F 17/276; G06F 3/04842; G06Q 10/107; H04L 51/14; H04L 61/1594
See application file for complete search history.

(56) References Cited

U.S. PATENT DOCUMENTS

| | | | | |
|---|---|---|---|---|
| 2009/0299727 | A1* | 12/2009 | Fux | G06F 3/0237 704/4 |
| 2010/0017194 | A1* | 1/2010 | Hammer | G06F 17/2785 704/9 |
| 2011/0004692 | A1* | 1/2011 | Occhino | H04L 67/16 709/228 |
| 2013/0290436 | A1* | 10/2013 | Martin | G06Q 10/107 709/206 |
| 2015/0200878 | A1* | 7/2015 | Shih | H04L 51/046 709/206 |
| 2017/0083211 | A1* | 3/2017 | Ramkumar | G06F 3/04842 |

* cited by examiner

*Primary Examiner* — Nicholas Klicos
(74) *Attorney, Agent, or Firm* — Cooper Legal Group, LLC

(57) ABSTRACT

One or more computing devices, systems, and/or methods for adjusting recipients of a message are provided. For example, a trigger item may be detected in a first input field, of a messaging interface, corresponding to a body of a message. A list of user identifications may be generated and/or displayed. A first content item may be detected in the second input field following the trigger item. A second list of user identifications may be generated based upon the first content item and/or the second list of user identifications may be displayed. A first user identification may be selected by receiving a selection of the first user identification from the second list of user identifications. A first contact item associated with the first user identification may be entered into one or more second input fields corresponding to one or more recipients of the message.

20 Claims, 17 Drawing Sheets

ADJUSTING RECIPIENTS OF A MESSAGE

BACKGROUND

Many services, such as email services, instant messaging services, social networks and apps may allow a user to create an account for sending and receiving messages. The user may compose a message for transmission to one or more recipients. The user may intend to add a recipient to the one or more recipients of the message and/or remove a recipient from the one or more recipients of the message. However, the user may forget to add or remove recipients, and the message may not be transmitted to one or more intended messaging accounts and/or may be transmitted to one or more unintended messaging accounts.

SUMMARY

In accordance with the present disclosure, one or more computing devices and/or methods are provided. In an example, a graphical user interface may be controlled to display an email interface. A first request to compose an email message may be received via the email interface. Responsive to receiving the first request, the graphical user interface may be controlled to display an email composition interface comprising one or more first input fields corresponding to one or more recipients of the email message and a second input field corresponding to a body of the email message. A trigger item may be detected in the second input field. Responsive to detecting the trigger item, a user database may be analyzed to generate a list of user identifications. The graphical user interface may be controlled to display the list of user identifications. One or more content items may be monitored for in the second input field following the trigger item. A first content item may be detected in the second input field following the trigger item. Responsive to detecting the first content item, the user database may be analyzed to generate a second list of user identifications based upon the first content item. The graphical user interface may be controlled to display the second list of user identifications. A first user identification may be selected by receiving a selection of the first user identification from the second list of user identifications and/or detecting the first user identification in the second input field. Responsive to selecting the first user identification, a first contact item associated with the first user identification may be entered into the one or more first input fields. A second request may be received to transmit the email message. Responsive to receiving the second request, the email message may be transmitted to one or more email addresses identified by the one or more first input fields.

In an example, a graphical user interface may be controlled to display a messaging interface comprising one or more first input fields corresponding to one or more recipients of a message and a second input field corresponding to a body of the message. A trigger item may be detected in the second input field. Responsive to detecting the trigger item, the one or more first input fields may be analyzed to generate a list of user identifications. The graphical user interface may be controlled to display the list of user identifications. A first user identification may be selected by receiving a selection of the first user identification from the list of user identifications and/or detecting the first user identification in the second input field. Responsive to selecting the first user identification, a first contact item associated with the first user identification may be removed from the one or more first input fields. A request to transmit the message may be received. Responsive to receiving the request, the message may be transmitted to one or more messaging accounts identified by the one or more first input fields.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
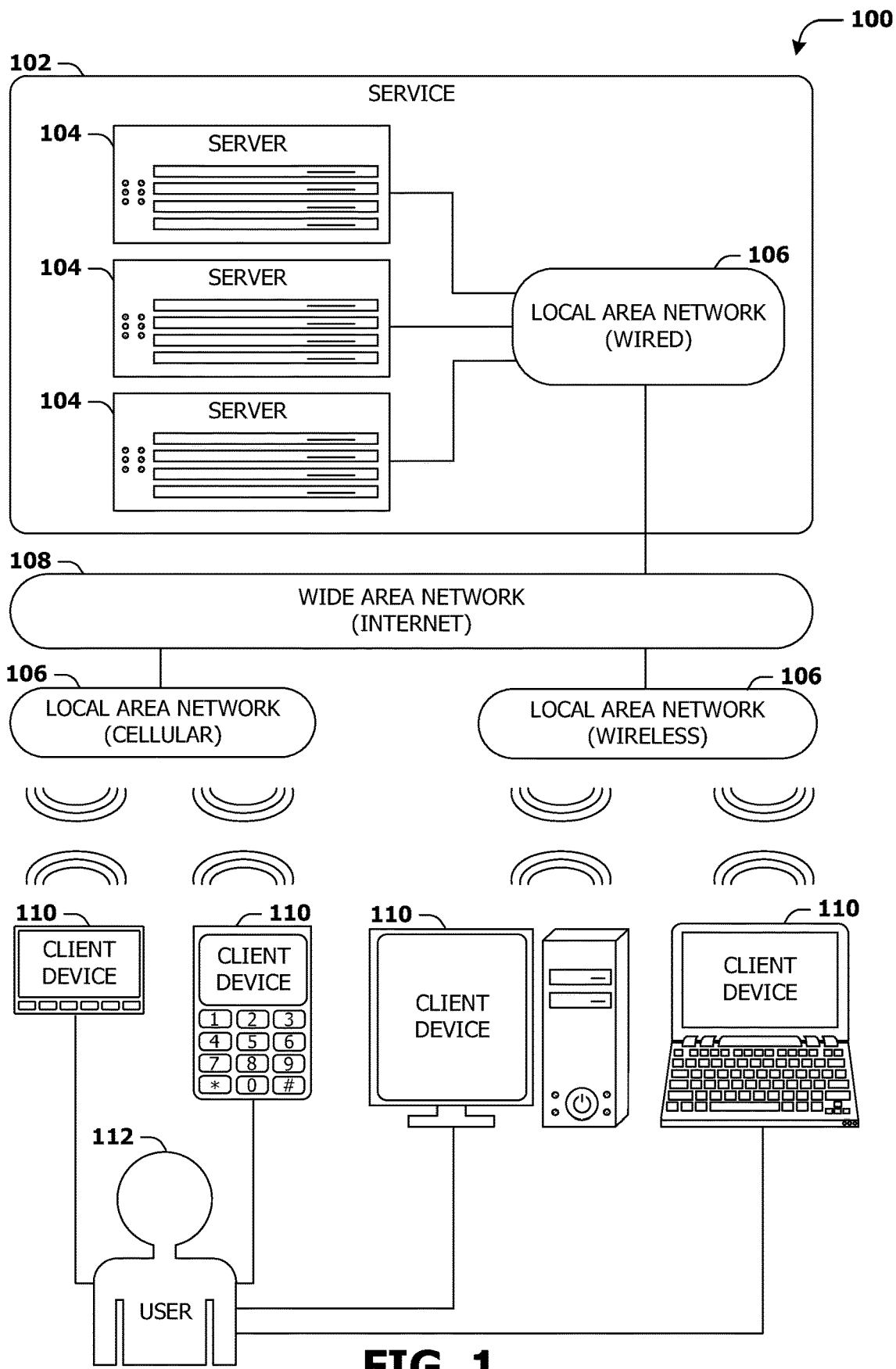
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
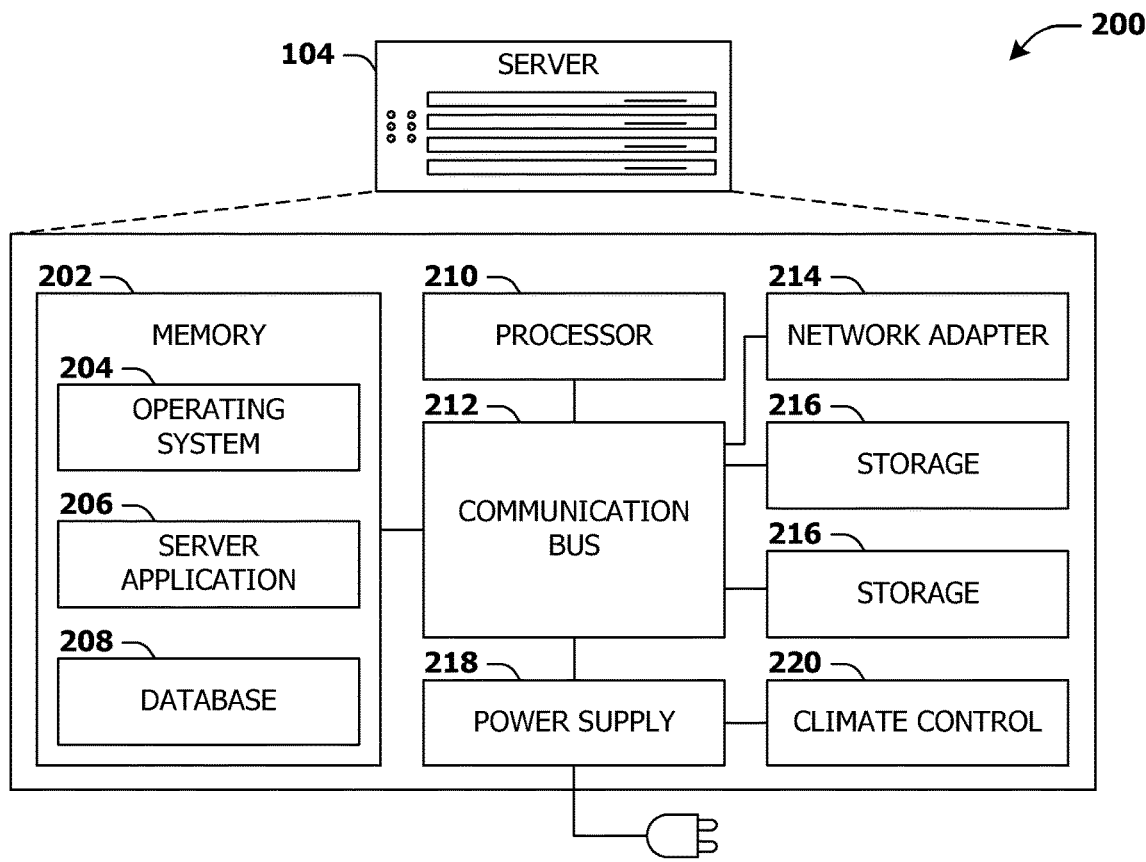
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
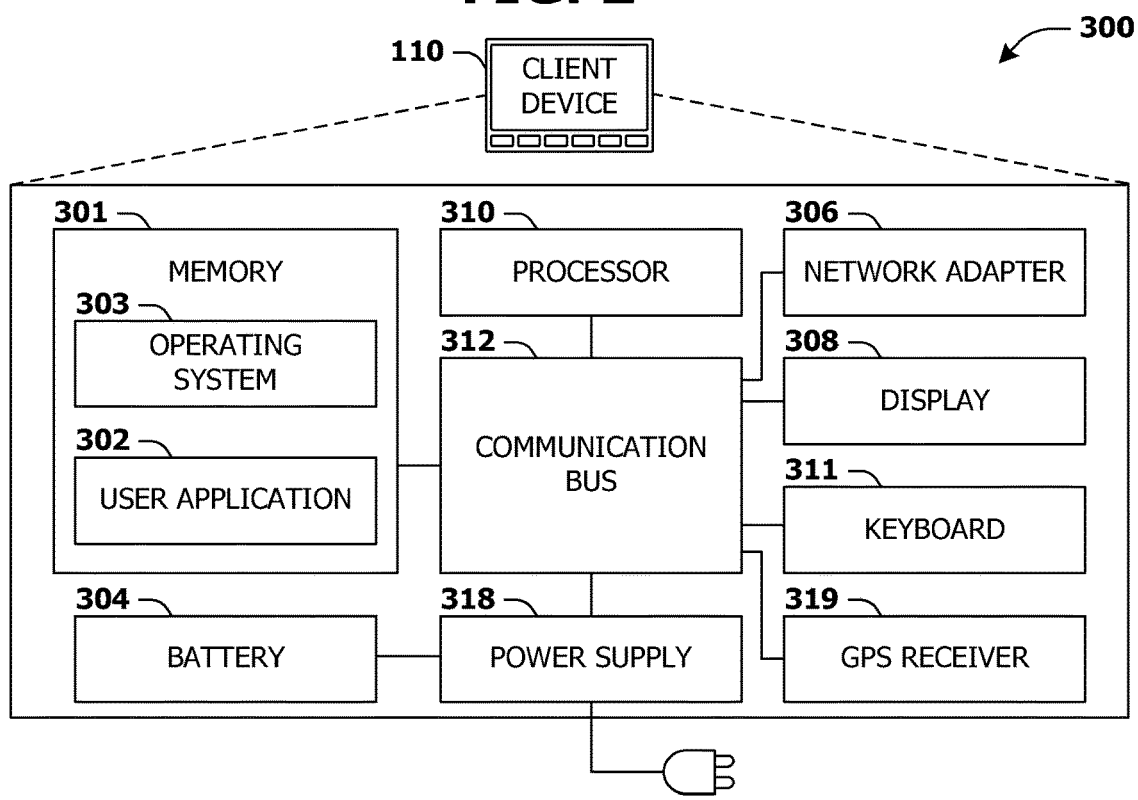
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for adjusting (e.g., adding and/or removing) recipients of messages are provided. For example, a user may access and/or interact with a service for sending and receiving messages (e.g., such as an email service, a text messaging service, an instant message service, a social network, an application, etc.). A messaging account of the user with the service may be accessed and/or interacted with via one or more interfaces, such as a messaging interface. Accordingly, the user may compose a message using the messaging interface. The messaging interface may comprise one or more first input fields corresponding to one or more recipients of the message. For example, the one or more first input fields may include a "To" field, a "CC" field and/or a "BCC" field. Alternatively and/or additionally, the messaging interface may comprise a second input field corresponding to a body of the message. The user may intend to add a first recipient to the one or more first input fields and/or remove a second recipient from the one or more first input fields. For example, the user may enter a first user identification of the first recipient into the second input field (e.g., and/or at the top of the body of the message) and/or the user may enter a second user identification corresponding to the second recipient into the second input field (e.g., and/or at the top of the body of the message). However, the user may not (e.g., and/or may forget to) add the first recipient to the one or more first input fields and/or may not (e.g., and/or may forget to) remove the second recipient from the one or more first input fields. Thus, in accordance with one or more of the techniques presented herein, the first user identification and/or the second user identification may be received (e.g., and/or detected) via the second input field, and the first user identification may automatically be added to the one or more first input fields and/or the second user identification may be automatically removed from the one or more first input fields.

Figure 4A:
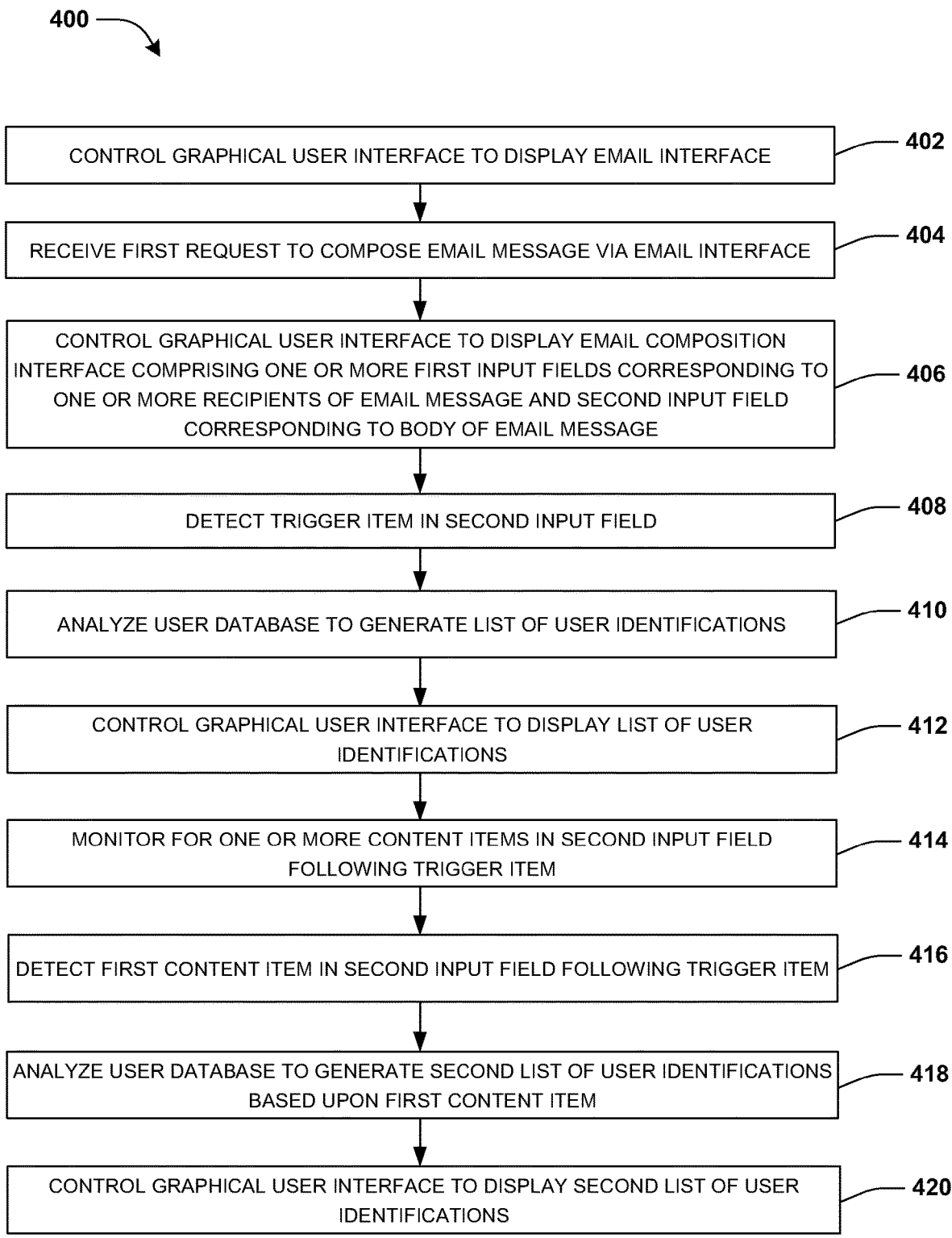
FIG. 4A is a first part of a flow chart illustrating an example method for adding and/or removing recipients of email messages.
Figure 4B:
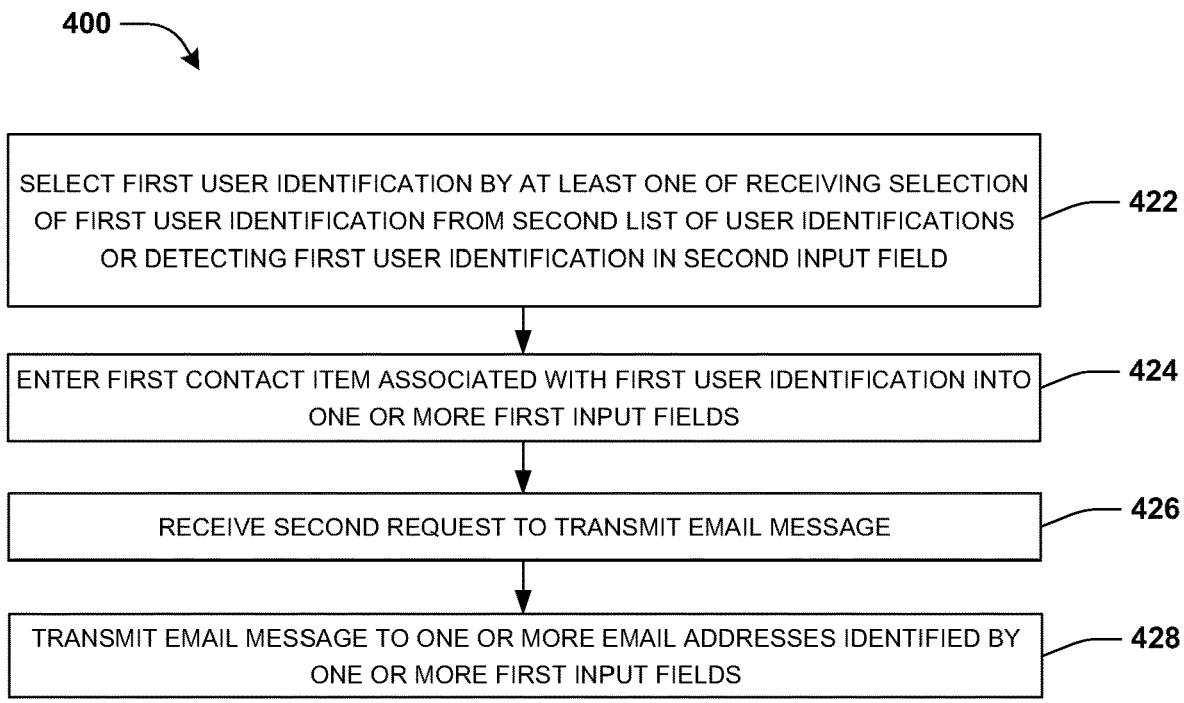
FIG. 4B is a second part of a flow chart illustrating an example method for adding and/or removing recipients of email messages.

An embodiment of adding and/or removing recipients of email messages is illustrated by an example method 400 of FIGS. 4A-4B. A user, such as user Jill, (e.g., and/or a client device associated with the user) may access and/or interact with an email service for sending and receiving email messages. An email account of the user with the email service may be accessed and/or interacted with via one or more interfaces of an email client, a browser, an application, etc. on the client device. Accordingly, at 402, a graphical user interface (e.g., of the client device) may be controlled to display an email interface. The email interface may comprise a list of email messages received via the email service. Alternatively and/or additionally, the email interface may comprise one or more selectable inputs. For example, the email interface may comprise a first selectable input corresponding to an option for composing a new email message. Alternatively and/or additionally, each email message of the list of email messages may comprise a selectable input for viewing the email message (e.g., corresponding to the selectable input).

At 404, a first request to compose an email message may be received via the email interface. In some examples, the first request may be received via a selection of the first selectable input (e.g., corresponding to the option for composing a new email message). Alternatively and/or additionally, a selection of a second selectable input corresponding to a first email message of the list of email messages may be received. Responsive to (e.g., receiving) the selection of the second selectable input, the first email message and/or one or more second selectable inputs may be displayed. For example, a third selectable input, corresponding to an option for responding to (e.g., and/or replying to) a sender of the first email message, may be displayed. Accordingly, the first request may be received via a selection of the third selectable input. Alternatively and/or additionally, a fourth selectable input, corresponding to an option for responding to (e.g., and/or replying to) the sender and one or more recipients (e.g., other than the user) of the first email message, may be displayed. Accordingly, the first request may be received via a selection of the fourth selectable input.

At 406, responsive to receiving the first request, the graphical user interface (e.g., of the client device) may be controlled to display an email composition interface. The email composition interface may comprise one or more first input fields corresponding to one or more recipients of the email message. Alternatively and/or additionally, the email composition interface may comprise a second input field corresponding to a body of the email message. In some examples, the one or more first input fields may comprise a third input field corresponding to one or more first recipients of the email message. Alternatively and/or additionally, the one or more first input fields may comprise a fourth input field corresponding to one or more second recipients of the email message. In some examples, the one or more second recipients may comprise carbon copied (e.g., CC) recipients. Alternatively and/or additionally, the one or more first input fields may comprise a fifth input field corresponding to one or more third recipients of the email message. In some examples, the one or more third recipients may comprise blind carbon copied (e.g., BCC) recipients.

At 408, a trigger item may be detected in the second input field. In some examples, the trigger item may be associated with adding one or more user identifications to the one or more first input fields. For example, the trigger item may be entered into the second input field by the user (e.g., via the client device). In some examples, the trigger item may be entered into the second input field using a touchscreen (e.g., of the client device), one or more switches (e.g., one or more buttons), a conversational interface (e.g., a voice recognition and natural language interface), etc. In some examples, one or more trigger items may be monitored for (e.g., by the client device) based upon a location of a caret (e.g., a text cursor) of the email composition interface. For example, the one or more trigger items may be monitored for (e.g., by the client device) responsive to determining that the caret of the email composition interface is within a threshold number of lines from a beginning of the second input field (e.g., the caret is within the top line, the top 2 lines, the top 3 lines, etc.).

Alternatively and/or additionally, the one or more trigger items may be monitored for (e.g., by the client device) regardless of the location of the caret. For example, responsive to detecting the trigger item (e.g., while monitoring for the one or more trigger items), one or more actions associated with adding a recipient of the email message may be performed. Alternatively and/or additionally, responsive to detecting the trigger item, the location of the trigger item may be determined. Responsive to determining that the trigger item is located within the threshold number of lines from the beginning of the second input field, the one or more actions may be performed. Alternatively and/or additionally, responsive to determining that the trigger item is not located within the threshold number of lines from the beginning of the second input field, the one or more actions may not be performed.

In some examples, the trigger item may comprise a symbol (e.g., "+", "@", "&", "#", etc.). Alternatively and/or additionally, the trigger item may comprise a set of characters matching at least a portion of a content item in a user database. The user database may comprise a plurality of sets of user information corresponding to users associated with the user. For example, each set of user information of the plurality of sets of user information may comprise contact information of a user contact associated with the email account of the user. In some examples, the user database may comprise a data structure of the plurality of sets of user information. The user database may be stored on the client device (e.g., and/or one or more servers connected to the client device via a network connection). The trigger item may be detected and/or identified by analyzing the user database to determine whether the trigger item matches one or more content items in the plurality of sets of user information. In an example, the set of characters of the trigger item may comprise "Sarah". The trigger item may be detected and/or identified by analyzing the user database and determining that "Sarah" matches one or more content items in the plurality of sets of user information.

At 410, responsive to detecting the trigger item, the user database may be analyzed to generate a list of user identifications. In some examples, the list of user identifications may be generated based upon (e.g., previous) activity (e.g., email correspondence, messaging correspondence, etc.) between the user and user contacts of the user database. For example, the list of user identifications may be generated based upon levels of activity (e.g., frequencies of email correspondence, frequencies of messaging correspondence, etc.) between the user and the user contacts. For example, the user may have a first activity level with a first user contact of the user contacts (e.g., of the user database). The user may have a second activity level with a second user contact of the user contacts. The first activity level may be greater than the second activity level. Accordingly, the list of user identifications may be generated comprising the first user contact above the second user contact.

Alternatively and/or additionally, the list of user identifications may be generated based upon latest activity (e.g., most recent activity) between the user and the user contacts. For example, latest activity between the user and a third user contact occurred at a first time. Latest activity between the user and a fourth user contact occurred at a second time. The first time may be after the second time (e.g., and the first time may be more recent than the second time). Accordingly, the list of user identifications may be generated comprising the third user contact above the fourth user contact.

Alternatively and/or additionally, if the trigger item comprises the set of characters (e.g., rather than (e.g., merely) the symbol), the list of user identifications may be generated based upon the set of characters. For example, the user database may be analyzed to determine one or more content items in the plurality of sets of user information that match the trigger item. Accordingly, the list of user identifications may be generated comprising one or more user contacts associated with the one or more content items. In an example, the set of characters of the trigger item may comprise "Sarah". The user database may be analyzed to determine that the set of characters match a first user identification (e.g., corresponding to a first user contact) comprising "Sarah M" and/or a second user identification (e.g., corresponding to a second user contact) comprising "Sarah Smith". Accordingly, the list of user identifications may be generated comprising the first user identification and/or the second user identification.

At 412, the graphical user interface may be controlled to display the list of user identifications. For example, the list of user identifications may be displayed adjacent to (e.g., below, above, next to, etc.) the trigger item. The list of user identifications may comprise one or more selectable inputs. In some examples, each selectable input of the list of user identifications may comprise a graphical object (e.g., profile picture) associated with a user contact, a user identification associated with a user contact and/or an email address associated with a user contact.

At 414, one or more content items may be monitored for in the second input field following the trigger item. For example, the one or more content items monitored for may comprise one or more characters (e.g., letters, numbers, etc.). At 416, a first content item may be detected in the second input field following the trigger item. In some examples, the first content item may be entered into the second input field using the touchscreen, the one or more switches, the conversational interface, etc.

At 418, responsive to detecting the first content item, the user database may be analyzed to generate a second list of user identifications based upon the first content item. For example, the user database (e.g., and/or the list of user identifications) may be analyzed to determine one or more content items in the plurality of sets of user information that match the first content item. For example, if the trigger item comprises the symbol (e.g., rather than the set of characters), the first content item may be compared to first parts of content items of the user database (e.g., and/or of the list of user identifications) to determine one or more user identifications corresponding to content items having a beginning (e.g., and/or middle, end, etc.) that match the first content item. For example, the trigger item may comprise "+" and/or the first content item may comprise "S". The first content item may be compared to beginnings of words in the user database to determine that the first content item matches the first user identification (e.g., comprising "Sarah M"), the second user identification (e.g., comprising "Sarah Smith") and/or a third user identification comprising "Ferris Sanchez". Accordingly, the second list of user identifications may be generated comprising the first user identification, the second user identification and/or the third user identification.

Alternatively and/or additionally, if the trigger item comprises the set of characters (e.g., rather than the symbol), the second list of user identifications may be generated based upon a combination of the set of characters and the first content item. For example, the user database (e.g., and/or of the list of user identifications) may be analyzed to determine one or more second content items in the plurality of sets of user information that match the combination of the set of characters and the first content item. Accordingly, the list of user identifications may be generated comprising one or more user identifications associated with the combination of the set of characters and the first content item. In an example, the set of characters of the trigger item may comprise "Sarah" and/or the first content item may comprise "Sm". Accordingly, the combination of the set of characters and the first content item may comprise "Sarah Sm". The user database (e.g., and/or the list of user identifications) may be analyzed to determine that the combination of the set of characters and the first content item match the second user identification (e.g., comprising "Sarah Smith") and/or a fourth user identification comprising "Sarah Small". In some examples, the second list of user identifications may be generated independent of the list of user identifications, while in some examples, the second list of user identifications may be generated based upon and/or to revise/update the list of user identifications.

At 420, the graphical user interface may be controlled to display the second list of user identifications. For example, the second list of user identifications may be displayed adjacent to (e.g., below, above, next to, etc.) the trigger item and/or the first content item. In some examples, the list of user identifications may not be displayed while the second list of user identifications is displayed. The second list of user identifications may comprise one or more second selectable inputs. In some examples, each selectable input of the second list of user identifications may comprise a graphical object (e.g., profile picture) associated with a user contact, a user identification associated with a user contact and/or an email address associated with a user contact.

At 422, the second user identification may be selected by receiving a selection of the second user identification from the second list of user identifications and/or by detecting the second user identification in the second input field. For example, a fifth selectable input corresponding to the second user identification may be selected via (e.g., the touchscreen, the one or more switches, the conversational interface, etc. of) the client device. Alternatively and/or additionally, the second user identification may be detected responsive to the second user identification being entered into the second input field (e.g., using the touchscreen, the one or more switches, the conversational interface, etc.).

In an example, the fifth selectable input corresponding to the second user identification (e.g., comprising "Sarah Smith") may be selected from the second list of user identifications by the user (e.g., using the touchscreen, the one or more switches, the conversational interface, etc.). Alternatively and/or additionally, the second user identification may be entered (e.g., and/or typed) into the second input field by the user (e.g., using the touchscreen, the one or more switches, the conversational interface, etc.).

Alternatively and/or additionally, the second user identification may be selected by receiving a selection of the second user identification from the list of user identifications. For example, rather than entering the first content item (e.g., following the trigger item), the user may select a sixth selectable option corresponding to the second user identification from the list of user identifications (e.g., using the touchscreen, the one or more switches, the conversational interface, etc.). It may be appreciated that in such an example, the second list of user identifications may not be generated and/or displayed.

In some examples, the second list of user identifications may not be generated and/or displayed responsive to the first content item being entered (e.g., and/or typed) into the second input field. Alternatively and/or additionally, the list of user identifications may not be generated and/or displayed responsive to the trigger item being entered (e.g., and/or typed) into the second input field. Accordingly, the second user identification may be selected responsive to the second user identification being entered (e.g., and/or typed) into the second input field by the user (e.g., using the touchscreen, the one or more switches, the conversational interface, etc.) with no list of user identification being generated and/or displayed. Alternatively and/or additionally, (e.g., merely) the list of user identifications may be generated and/or displayed responsive to the trigger item being entered into the second input field and the second list of user identifications may not be generated and/or displayed responsive to the first content item being entered (e.g., and/or typed) into the second input field.

At 424, responsive to selecting the second user identification, a first contact item associated with the second user identification may be entered into the one or more first input fields. In some examples, the first contact item may comprise a first graphical object (e.g., profile picture) associated with the second user contact, a first email address associated with the second user contact and/or the second user identification.

In some examples, message content data corresponding to the body of the email message may be entered (e.g., by the user) into the second input field via (e.g., the touchscreen, the one or more switches, the conversational interface, etc. of) the client device. In some examples, the message content data may (e.g., automatically) be displayed below the trigger item and/or the second user identification. In an example, the trigger item and/or the second user identification are entered within the message content data (e.g., rather than above the message content data). Accordingly, responsive to selecting the second user identification, the trigger item and/or the second user identification may be displayed (e.g., and/or moved to a location) above the message content data.

In some examples, the trigger item and/or the second user identification may be comprised within a first section (e.g., "changelog" section) of the second input field. In some examples, if the trigger item comprises the set of characters (e.g., rather than the symbol), the first section may comprise a second symbol (e.g., "+", "@", "&", "#", etc.) preceding the second user identification. The first section may comprise the trigger item and/or the second user identification (e.g., and/or the second symbol) in a first format. In some examples, the message content data may be displayed below the first section, in a second format. The second format may be different than the first format. For example, a first font, a first text color, a first background color, a first background pattern, a first size, etc. of the trigger item and/or the second user identification (e.g., and/or the second symbol) may be different than a second font, a second text color, a second background color, a second background pattern, a second size, etc. of the message content data.

In some examples, a second email address corresponding to a fifth user identification, a second contact item, etc. may be detected in the one or more first input fields. For example, the fifth user identification (e.g., and/or the second email address) may be entered (e.g., by the user) into the one or more first input fields via (e.g., the touchscreen, the one or more switches, the conversational interface, etc. of) the client device. In some examples, responsive to detecting the fifth user identification (e.g., and/or the second email address), the fifth user identification may (e.g., automatically) be entered into the second input field.

In some examples, the fifth user identification may be displayed above the message content data. In some examples, the fifth user identification may be comprised within the first section of the second input field. The fifth user identification may be displayed adjacent to the trigger item and/or the second user identification (e.g., and/or the second symbol). In some examples, the first section may comprise a fourth symbol (e.g., ",", "/", "&", etc.) between the second user identification and the fifth user identification. Alternatively and/or additionally, the fifth user identification may be displayed in the first format.

In some examples, a third contact item may be removed from the one or more first input fields. The third contact item may comprise a sixth user identification and/or information corresponding to a fifth contact user (e.g., associated with the sixth user identification). In some examples, the third contact item may be removed (e.g., by the user) from the one or more first input fields via (e.g., the touchscreen, the one or more switches, the conversational interface, etc. of) the client device. In some examples, responsive to detecting the removal of the third contact item from the one or more first input fields, an item may be entered into the second input field (e.g., by the client device) and/or the sixth user identification may be entered into the second input field (e.g., by the client device). The item may comprise a symbol (e.g., "–"). Alternatively and/or additionally, the item may comprise a second set of characters (e.g., "Recipients removed from email conversation:", "Removed users:", etc.).

In some examples, the item and/or the sixth user identification may be displayed above the message content data. In some examples, the item and/or the sixth user identification may be comprised within the first section of the second input field. For example, the item and/or the sixth user identification may be displayed adjacent to the trigger item, the second user identification and/or the fifth user identification. Alternatively and/or additionally, the sixth user identification may be displayed in the first format.

Alternatively and/or additionally, the item and/or the sixth user identification may be comprised within a second section of the second input field. For example, the second section may comprise the item preceding the sixth user identification. The second section may comprise the item and/or the sixth user identification in a third format. In some examples, the third format may be the same as the first format (e.g., of the first section). Alternatively and/or additionally, the third format may be different than the second format. In a first example, the sixth user identification may comprise "Janice B" and the second section may comprise the item and the sixth user identification. Accordingly, the second section may comprise "–Janice B". In a second example, the second section may comprise the sixth user identification and the third format may comprise a strikethrough through the sixth user identification. Accordingly, the second section may comprise "~~Janice B~~".

A second trigger item may be detected in the second input field. In some examples, the second trigger item may be associated with removing one or more user identifications from the one or more first input fields. For example, the second trigger item may be entered into the second input field by the user (e.g., via the client device). The second trigger item may comprise a third symbol (e.g., "–"). Alternatively and/or additionally, the second trigger item may comprise a third set of characters matching at least a portion of one or more content items of one or more user identifications within the one or more first input fields. In an example, the third set of characters of the second trigger item may comprise "Adam". The second trigger item may be detected and/or identified by analyzing the one or more first input fields and determining that "Adam" matches one or more content items of the one or more user identifications within the one or more first input fields.

Responsive to detecting the second trigger item, the one or more first input fields may be analyzed to generate a third list of user identifications. For example, the third list of user identifications may be generated based upon levels of activity (e.g., frequencies of email correspondence, frequencies of messaging correspondence, etc.) between the user and one or more user contacts corresponding to the one or more user identifications within the one or more first input fields. Alternatively and/or additionally, the third list of user identifications may be generated based upon latest activity (e.g., most recent activity) between the user and the one or more user contacts. Alternatively and/or additionally, if the second trigger item comprises the third set of characters (e.g., rather than the third symbol), the third list of user identifications may be generated based upon the third set of characters. For example, the one or more first input fields may be analyzed to determine one or more content items of the one or more user identifications within the one or more first input fields that match the second trigger item. Accordingly, the third list of user identifications may be generated comprising one or more user contacts associated with the one or more content items.

The graphical user interface may be controlled to display the third list of user identifications. For example, the third list of user identifications may be displayed adjacent to (e.g., below, above, next to, etc.) the second trigger item. The third list of user identifications may comprise one or more selectable inputs. In some examples, each selectable input of the third list of user identifications may comprise a graphical object (e.g., profile picture) associated with a user contact, a user identification associated with a user contact and/or an email address associated with a user contact.

A seventh user identification may be selected by receiving a selection of the seventh user identification from the third list of user identifications and/or by detecting the seventh user identification in the second input field following the second trigger item. For example, a seventh selectable input corresponding to the seventh user identification may be selected via (e.g., the touchscreen, the one or more switches, the conversational interface, etc. of) the client device. Alternatively and/or additionally, the second user identification may be detected responsive to the second user identification being entered into the second input field (e.g., using the touchscreen, the one or more switches, the conversational interface, etc.).

In some examples, responsive to selecting the seventh user identification, a third contact item associated with the seventh user identification may be removed from the one or more first input fields. In some examples, the seventh user identification may be displayed adjacent to the item and/or the sixth user identification. The seventh user identification may be comprised within the first section of the second input field. Alternatively and/or additionally, the seventh user identification may be displayed in the first format.

Alternatively and/or additionally, the seventh user identification may be comprised within the second section of the second input field. For example, the second section may comprise the item and/or the second trigger item preceding the sixth user identification and/or the seventh user identification. In some examples, the second section may comprise a fifth symbol (e.g., ",", "/", "&", etc.) between the sixth user identification and the seventh user identification. The second section may comprise the item, the second trigger item, the sixth user identification and/or the seventh user identification in the third format. In a first example, the seventh user identification may comprise "Adam S" and the second section may comprise the item, the sixth user identification, the fifth symbol and the seventh user identification. Accordingly, the second section may comprise "–Janice B, Adam S". In a second example, the second section may comprise the sixth user identification, the fifth symbol and the seventh user identification and the third format may comprise a strikethrough through the sixth user identification and the seventh user identification. Accordingly, the second section may comprise "Janice B, Adam S".

At 426, a second request to transmit the email message may be received. For example, the email composition interface may comprise an eighth selectable input corresponding to an option for sending (e.g., and/or transmitting) the email message to one or more email addresses identified by the one or more first input fields. Accordingly, the second request may be received via a selection of the eighth selectable input.

At 428, responsive to receiving the second request, the email message may be transmitted to the one or more email addresses identified by the one or more first input fields. For example, the email message may be transmitted to the first email address associated with the second user identification, the second email address associated with the fifth user identification and/or one or more (e.g., other) email addresses associated with one or more (e.g., other) user identifications (e.g., identified) within the one or more first input fields.

In some examples, the client device and/or the user (e.g., and/or an administrator of one or more email accounts comprising the email account of the user) may modify email account settings. For example, the email account settings may comprise a first option for transmitting a first representation of the email message to the one or more email addresses. Alternatively and/or additionally, the email account settings may comprise a second option for transmitting a second representation of the email message to the one or more email addresses. In some examples, the first representation of the email message may comprise the email message comprising the first section and/or the second section (e.g., within the second input field and/or the body of the email message). Alternatively and/or additionally, the second representation of the email message may comprise the email message without the first section and/or the second section.

Alternatively and/or additionally, responsive to receiving the second request, the graphical user interface may be controlled to display a ninth selectable input corresponding to the first representation of the email message and/or a tenth selectable input corresponding to the second representation of the email message. Accordingly, responsive to receiving a selection of the ninth selectable input, the first representation of the email message may be transmitted to the one or more email addresses. Alternatively and/or additionally, responsive to receiving a selection of the tenth selectable input, the second representation of the email message may be transmitted to the one or more email addresses.

One or more methods provided for adding and/or removing recipients of messages may be implemented using various messaging services (e.g., other than the email service). For example, the one or more methods for adding and/or removing recipients of messages may be implemented using a messaging service for sending and receiving messages (e.g., such as text messaging service, an instant messaging service, a social network, an application, etc.).

FIGS. 5A-5H illustrate examples of a system 501 for adding and/or removing recipients of email messages (e.g., and/or different types of messages). A user, such as user James, (e.g., and/or a client device 500 associated with the user) may access and/or interact with an email service (e.g., and/or a different type of messaging service) for sending and receiving email messages (e.g., and/or different types of messages). An email account of the user with the email service may be accessed and/or interacted with via one or more interfaces of an email client, a browser, an application, etc. on the client device 500. Accordingly, a graphical user interface (e.g., of the client device 500) may be controlled to display an email interface.

Figure 5A:
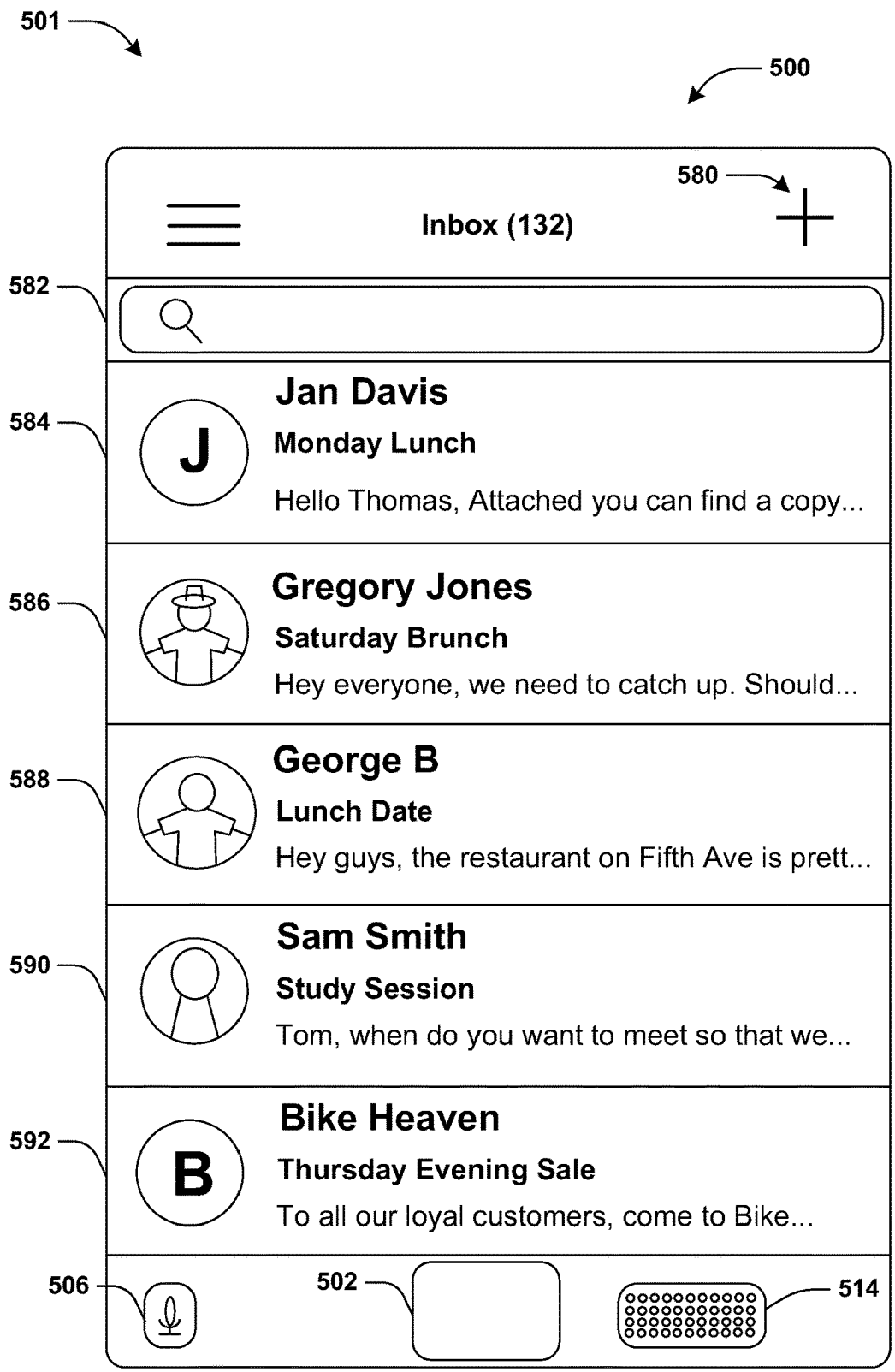
FIG. 5A is a component block diagram illustrating an example system for adding and/or removing recipients of email messages, where a graphical user interface of a client device is controlled to display an email interface.

FIG. 5A illustrates the graphical user interface of the client device 500 being controlled to display the email interface. The client device 500 may comprise a button 502, a microphone 506 and/or a speaker 514. In some examples, the email interface may comprise a search area 582 that may be used to search (e.g., for email messages, for user contacts, etc. of) the email account. Alternatively and/or additionally, the email interface may comprise a tenth selectable input 580 corresponding to an option for composing a new email message. In some examples, responsive to (e.g., receiving) a selection of the tenth selectable input 580, the graphical user interface of the client device 500 may be controlled to display an email composition interface.

The email interface may comprise a list of email messages received via the email service. For example, the list of email messages may comprise a first email message 584, a second email message 586, a third email message 588, a fourth email message 590 and/or a fifth email message 592. In some examples, the list of email messages may correspond to an inbox section associated with the email account, an "all emails" section associated with the email account, an "archived emails" section associated with the email account, etc. In some examples, responsive to (e.g., receiving) a selection of an email message of the list of email messages, the graphical user interface of the client device 500 may be controlled to display the email message. For example, a selection of the third email message 588 may be received (e.g., via the client device 500). Responsive to receiving the selection of the third email message 588, the graphical user interface 500 may be controlled to display the third email message 588.

Figure 5B:
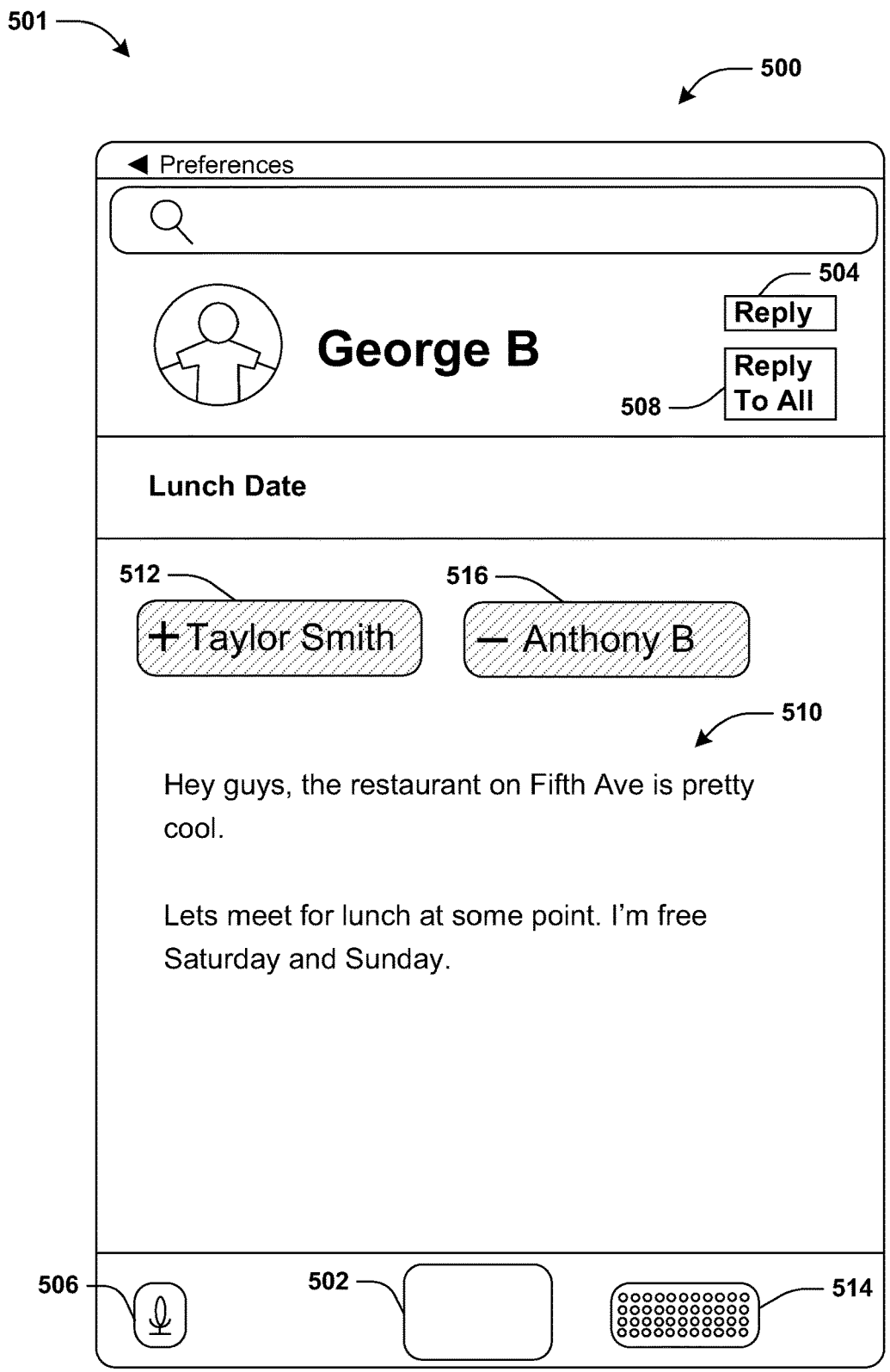
FIG. 5B is a component block diagram illustrating an example system for adding and/or removing recipients of email messages, where a graphical user interface of a client device is controlled to display a third email message.

FIG. 5B illustrates the graphical user interface of the client device 500 being controlled to display the third email message 588. In some examples, the graphical user interface may be controlled to display a first selectable input 504 and/or a second selectable input 508. For example, the first selectable input 504 may correspond to an option for responding to (e.g., and/or replying to) a sender of the third email message 588. In some examples, the sender of the third email message 588 may correspond to a first user contact associated with a first user identification "George B". Alternatively and/or additionally, the second selectable input 508 may correspond to an option for responding to (e.g., and/or replying to) the sender and one or more recipients (e.g., other than the user) of the third email message 588.

In some examples, the third email message 588 may comprise message content data 510. In some examples, the third email message 588 may comprise a first section 512 (e.g., "changelog" section) comprising a first item comprising "+" and/or a second user identification comprising "Taylor Smith". The first section 512 may indicate that the second user identification was added to an email conversation (e.g., by the sender) of which the third email message 588 is a part. Alternatively and/or additionally, the third email message 588 may comprise a second section 516 (e.g., "changelog" section) comprising a second item comprising "−" and/or a third user identification comprising "Anthony B". The second section 516 may indicate that the third user identification was removed from the email conversation (e.g., by the sender). In some examples, the third email message 588 may not comprise the first section 512 and/or the second section 516 (e.g., there may be no changelog associated with the third email message 588).

In some examples, a selection of the second selectable input 508 may be received (e.g., via the client device 500). Responsive to receiving the selection of the second selectable input 508, the graphical user interface of the client device 500 may be controlled to display the email composition interface.

Figure 5C:
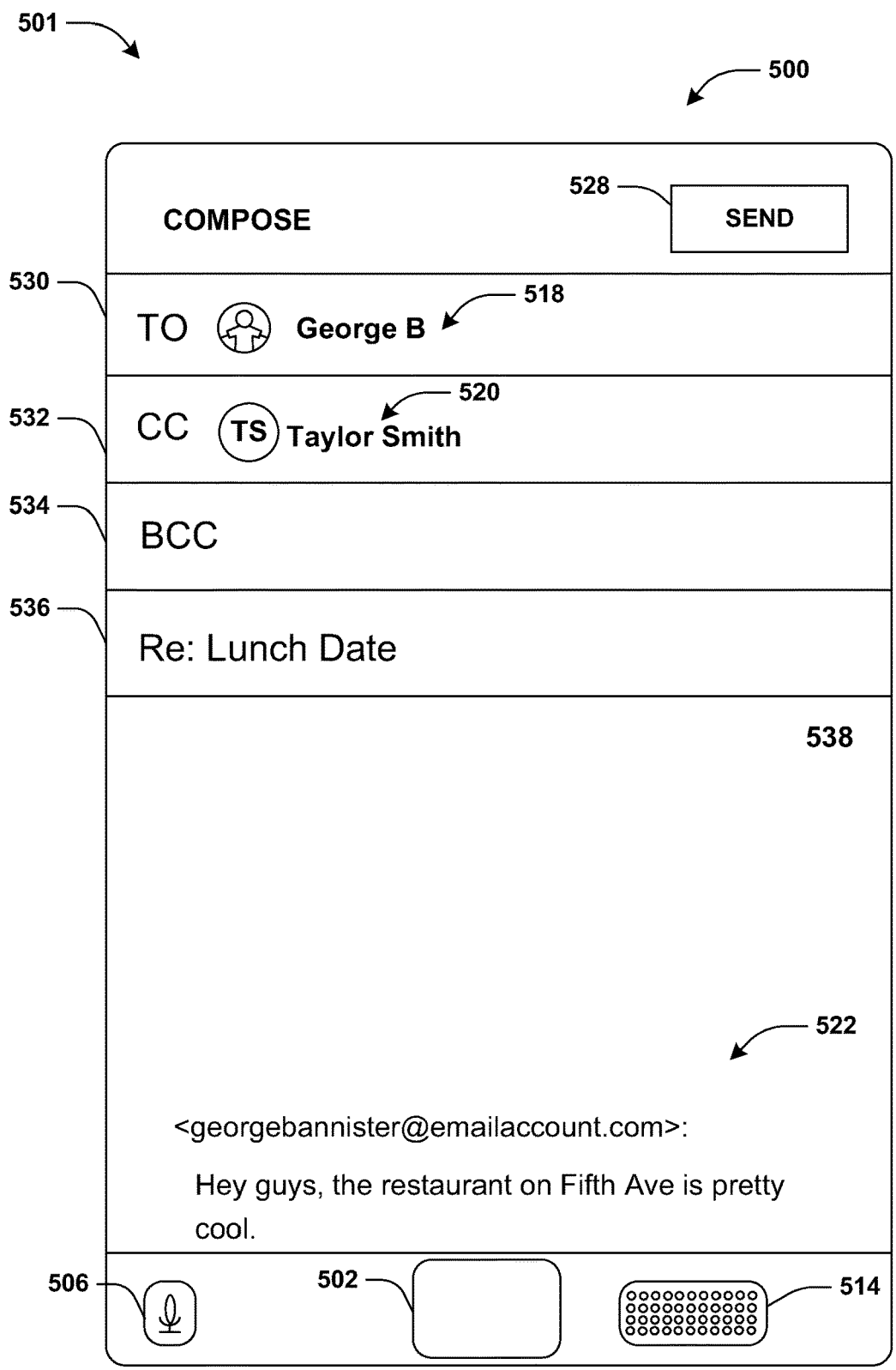
FIG. 5C is a component block diagram illustrating an example system for adding and/or removing recipients of email messages, where a graphical user interface of a client device is controlled to display an email composition interface.

FIG. 5C illustrates the graphical user interface of the client device 500 being controlled to display the email composition interface. In some examples, the email composition interface may comprise one or more first input fields corresponding to one or more recipients of an email message, a second input field 536 corresponding to a subject of the email message and/or a third input field 538 corresponding to a body of the email message.

For example, the one or more first input fields may comprise a fourth input field 530 corresponding to one or more first recipients of the email message. Alternatively and/or additionally, the one or more first input fields may comprise a fifth input field 532 corresponding to one or more second recipients of the email message. In some examples, the one or more second recipients may comprise carbon copied (e.g., CC) recipients. Alternatively and/or additionally, the one or more first input fields may comprise a sixth input field 534 corresponding to one or more third recipients of the email message. In some examples, the one or more third recipients may comprise blind carbon copied (e.g., BCC) recipients.

In some examples, a first contact item 518, comprising the first user identification and/or a first graphical object (e.g., profile picture), may be comprised within the fourth input field 530. Alternatively and/or additionally, a second contact item 520, comprising the second user identification and/or a second graphical object (e.g., profile picture), may be comprised within the fifth input field 532. In some examples, quoted text 522 corresponding to the email conversation may be comprised within the third input field 538. The quoted text 522 may comprise text from the third email message 588.

Figure 5D:
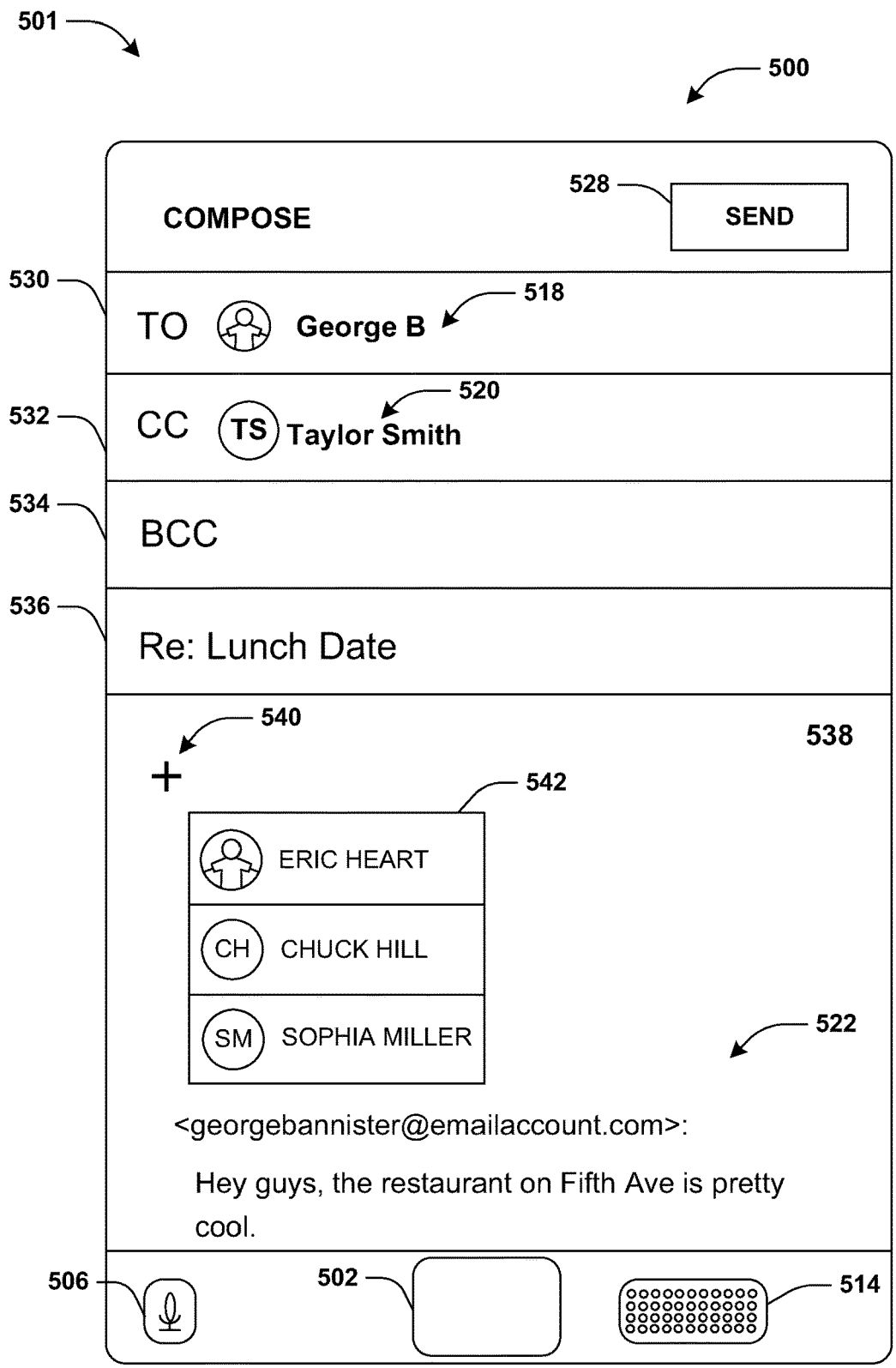
FIG. 5D is a component block diagram illustrating an example system for adding and/or removing recipients of email messages, where a trigger item is entered into a third input field.

FIG. 5D illustrates a trigger item 540 being entered into the third input field 538. In some examples, the trigger item 540 may be associated with adding one or more user identifications to the one or more first input fields. For example, the trigger item 540 may be entered into the third input field 538 by the user (e.g., via the client device 500). In some examples, the trigger item 540 may be entered into the third input field 538 using a touchscreen (e.g., of the client device 500), one or more switches (e.g., one or more buttons), a conversational interface (e.g., a voice recognition and natural language interface), etc. In some examples, the trigger item 540 may comprise a symbol (e.g., "+").

In some examples, the trigger item 540 may be detected (e.g., by the client device 500) in the third input field 538. Responsive to detecting the trigger item 540, a user database may be analyzed to generate a list of user identifications 542. The user database may comprise a plurality of sets of user information corresponding to users associated with the user. For example, each set of user information of the plurality of sets of user information may comprise contact information of a user contact associated with the email account of the user. In some examples, the user database may comprise a data structure of the plurality of sets of user information. The user database may be stored on the client device 500 (e.g., and/or one or more servers connected to the client device 500 via a network connection).

In some examples, the list of user identifications 542 may be generated based upon (e.g., previous) activity (e.g., email correspondence, messaging correspondence, etc.) between the user and user contacts of the user database. Alternatively and/or additionally, the list of user identifications 542 may be generated based upon latest activity (e.g., most recent activity) between the user and the user contacts. The graphical user interface (e.g., of the client device 500) may be controlled to display the list of user identifications 542. For example, the list of user identifications 542 may be displayed adjacent to (e.g., below, above, next to, etc.) the trigger item 540.

The list of user identifications 542 may comprise one or more selectable inputs. For example, a ninth selectable input of the list of user identifications 542 may comprise a fourth user identification "ERIC HEART" associated with a fourth user contact and/or a fourth graphical object (e.g., profile picture) associated with the fourth user contact. Alternatively and/or additionally, a third selectable input of the list of user identifications 542 may comprise a fifth user identification "CHUCK HILL" associated with a fifth user contact and/or a fifth graphical object associated with the fifth user contact. Alternatively and/or additionally, a fourth selectable input of the list of user identifications 542 may comprise a sixth user identification "SOPHIA MILLER" associated with a sixth user contact and/or a sixth graphical object associated with the sixth user contact.

Figure 5E:
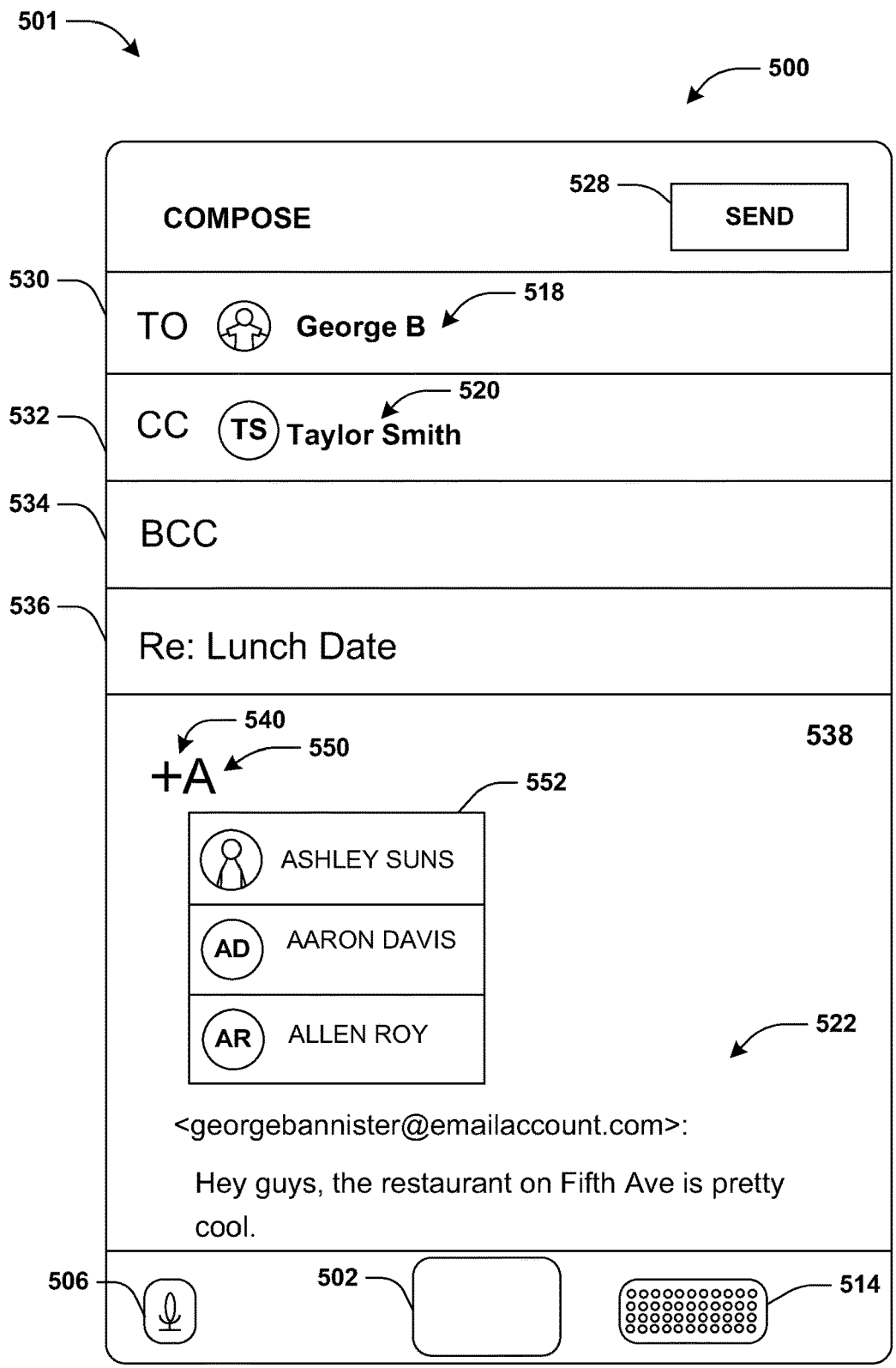
FIG. 5E is a component block diagram illustrating an example system for adding and/or removing recipients of email messages, where a first content item is entered into a third input field.

FIG. 5E illustrates a first content item 550 being entered into the third input field 538. In some examples, one or more content items may be monitored for in the third input field 538 following the trigger item 540. In some examples, the first content item 550 may be entered into the third input field 538 using the touchscreen, the one or more switches, the conversational interface, etc. In some examples, the first content item 550 may be detected (e.g., by the client device 500) in the third input field 538. Responsive to detecting the first content item 550, the user database may be analyzed to generate a second list of user identifications 552.

For example, the first content item 550 may be compared to first parts of content items of the user database to determine one or more user identifications corresponding to content items having a beginning (e.g., and/or middle, end, etc.) that match the first content item 550. For example, the first content item 550 may comprise "A". Accordingly, the first content item 550 may be compared to beginnings of words in the user database to determine that the first content item 550 matches a seventh user identification "ASHLEY SUNS", an eighth user identification "AARON DAVIS" and/or a ninth user identification "ALLEN ROY". Accordingly, the second list of user identifications may be generated comprising the seventh user identification, the eighth user identification and/or the ninth user identification. The graphical user interface (e.g., of the client device 500) may be controlled to display the second list of user identifications 552. For example, the second list of user identifications 552 may be displayed adjacent to (e.g., below, above, next to, etc.) the trigger item 540 and/or the first content item 550.

The second list of user identifications 552 may comprise one or more second selectable inputs. For example, a fifth selectable input of the second list of user identifications 552 may comprise the seventh user identification associated with a seventh user contact and/or a seventh graphical object associated with the seventh user contact. Alternatively and/or additionally, a sixth selectable input of the second list of user identifications 552 may comprise the eighth user identification associated with an eighth user contact and/or an eighth graphical object associated with the eighth user contact. Alternatively and/or additionally, a seventh selectable input of the second list of user identifications 552 may comprise the ninth user identification associated with a ninth user contact and/or a ninth graphical object associated with the ninth user contact.

In some examples, the seventh user identification may be selected by receiving a selection of the seventh user identification from the second list of user identifications 552. For example, the fifth selectable input (e.g., corresponding to the seventh user identification) may be selected via (e.g., the touchscreen, the one or more switches, the conversational interface, etc. of) the client device 500.

Figure 5F:
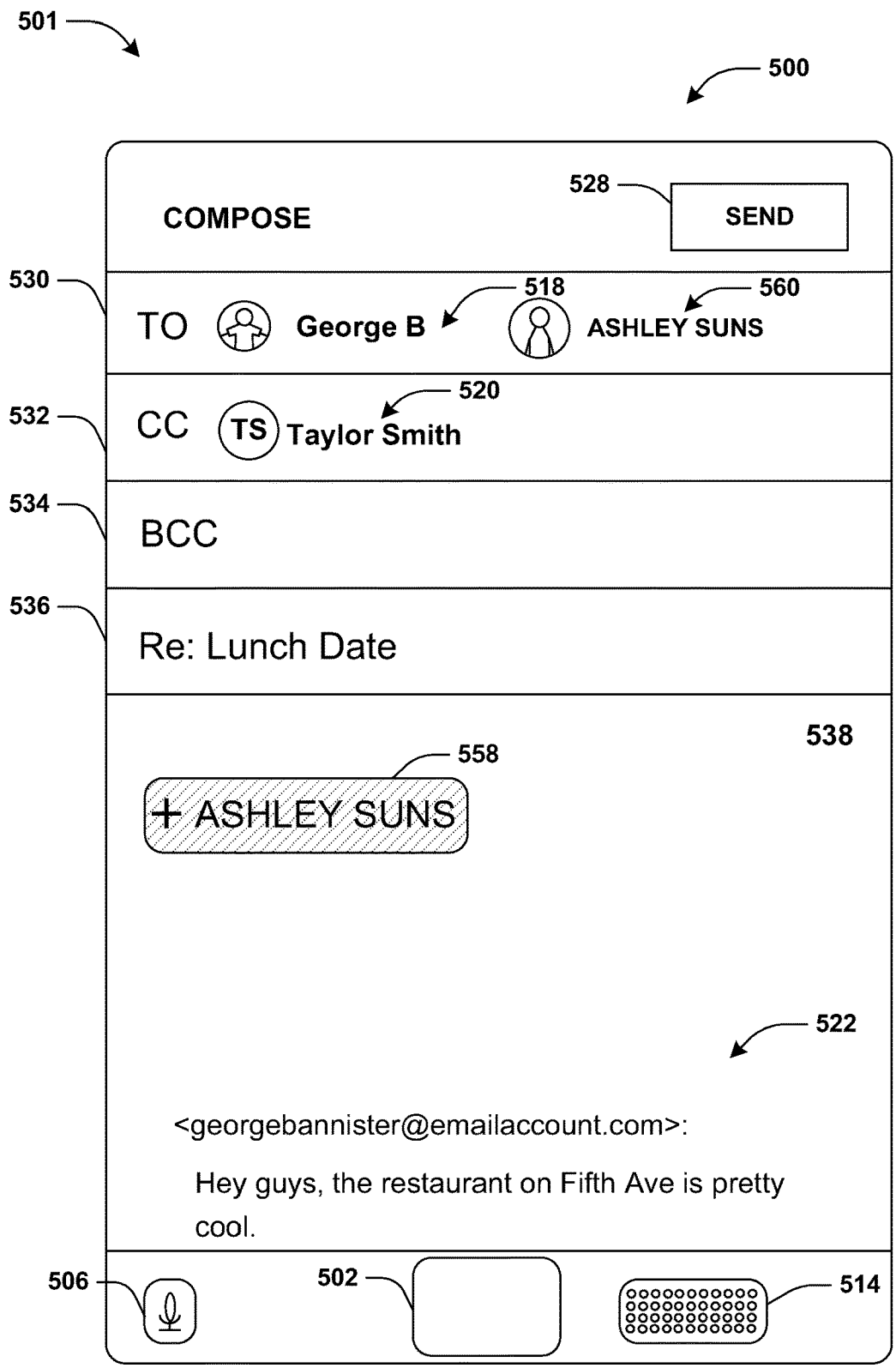
FIG. 5F is a component block diagram illustrating an example system for adding and/or removing recipients of email messages, where a third contact item, associated with a seventh user identification, is entered into one or more first input fields.

FIG. 5F illustrates a third contact item 560, associated with the seventh user identification, being entered into the one or more first input fields. For example, responsive to selecting the seventh user identification, the third contact item 560 may (e.g., automatically) be entered into the fourth input field 530. In some examples, the third contact item 560 may comprise the seventh user identification and/or the seventh graphical object. In some examples, the trigger item 540 and/or the seventh user identification may be comprised within a third section 558 (e.g., "changelog" section) of the third input field 538. In some examples, the third section 558 may comprise the trigger item 540 and/or the seventh user identification in a first format.

Figure 5G:
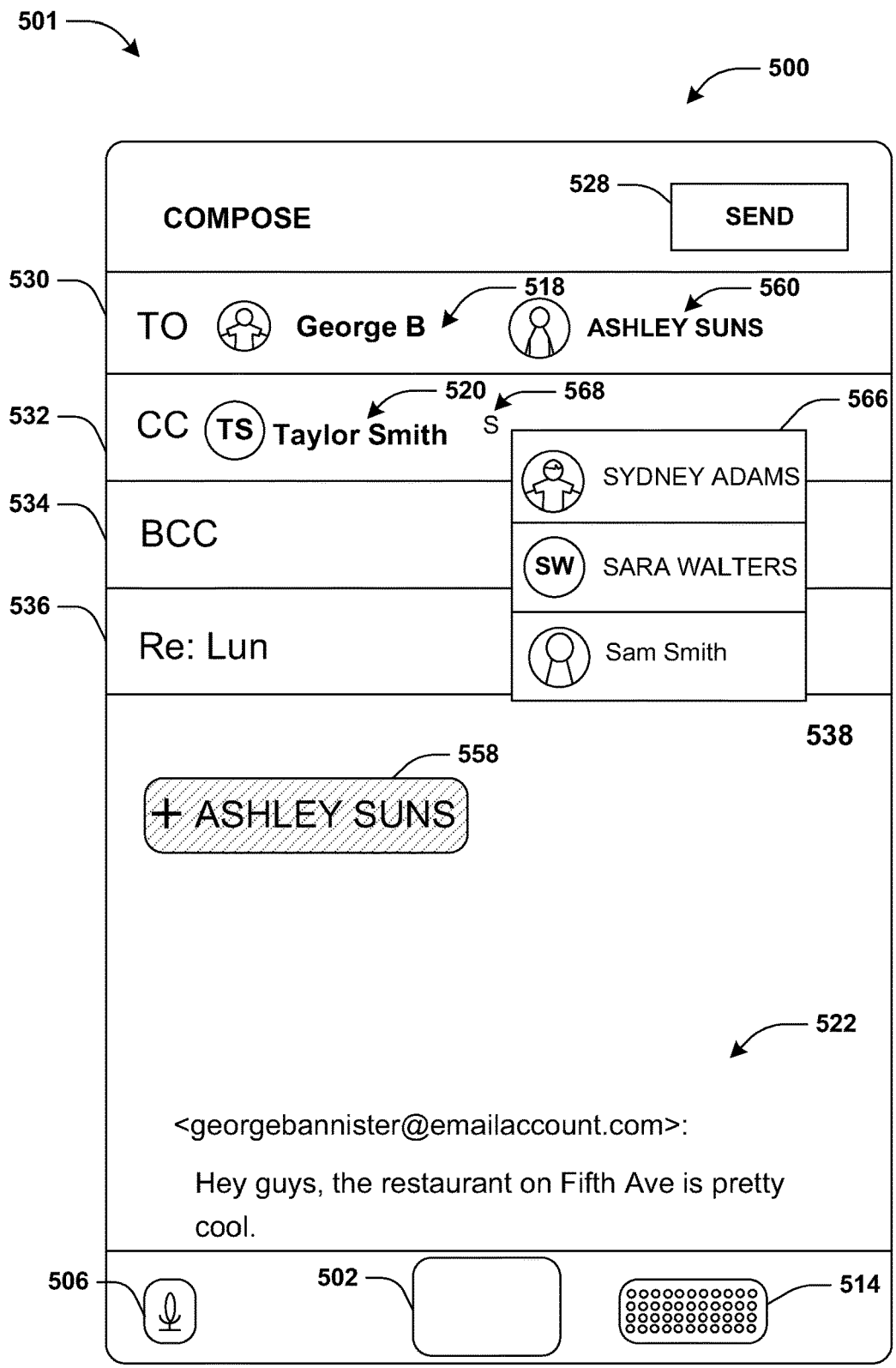
FIG. 5G is a component block diagram illustrating an example system for adding and/or removing recipients of email messages, where a second content item is entered into a fifth input field.

FIG. 5G illustrates a second content item 568 being entered into the fifth input field 532. In some examples, the second content item 568 may be entered into the fifth input field 568 using the touchscreen, the one or more switches, the conversational interface, etc. In some examples, the second content item 568 may be detected (e.g., by the client device 500) in the fifth input field 532. Responsive to detecting the second content item 568, the user database may be analyzed to generate a third list of user identifications 566. The graphical user interface (e.g., of the client device 500) may be controlled to display the third list of user identifications 566. For example, the third list of user identifications may be displayed adjacent to (e.g., below, above, next to, etc.) the second content item 568. In some examples, a tenth user identification "Sam Smith", associated with a tenth user contact, may be selected by receiving a selection of the tenth user identification from the third list of user identifications 566.

Figure 5H:
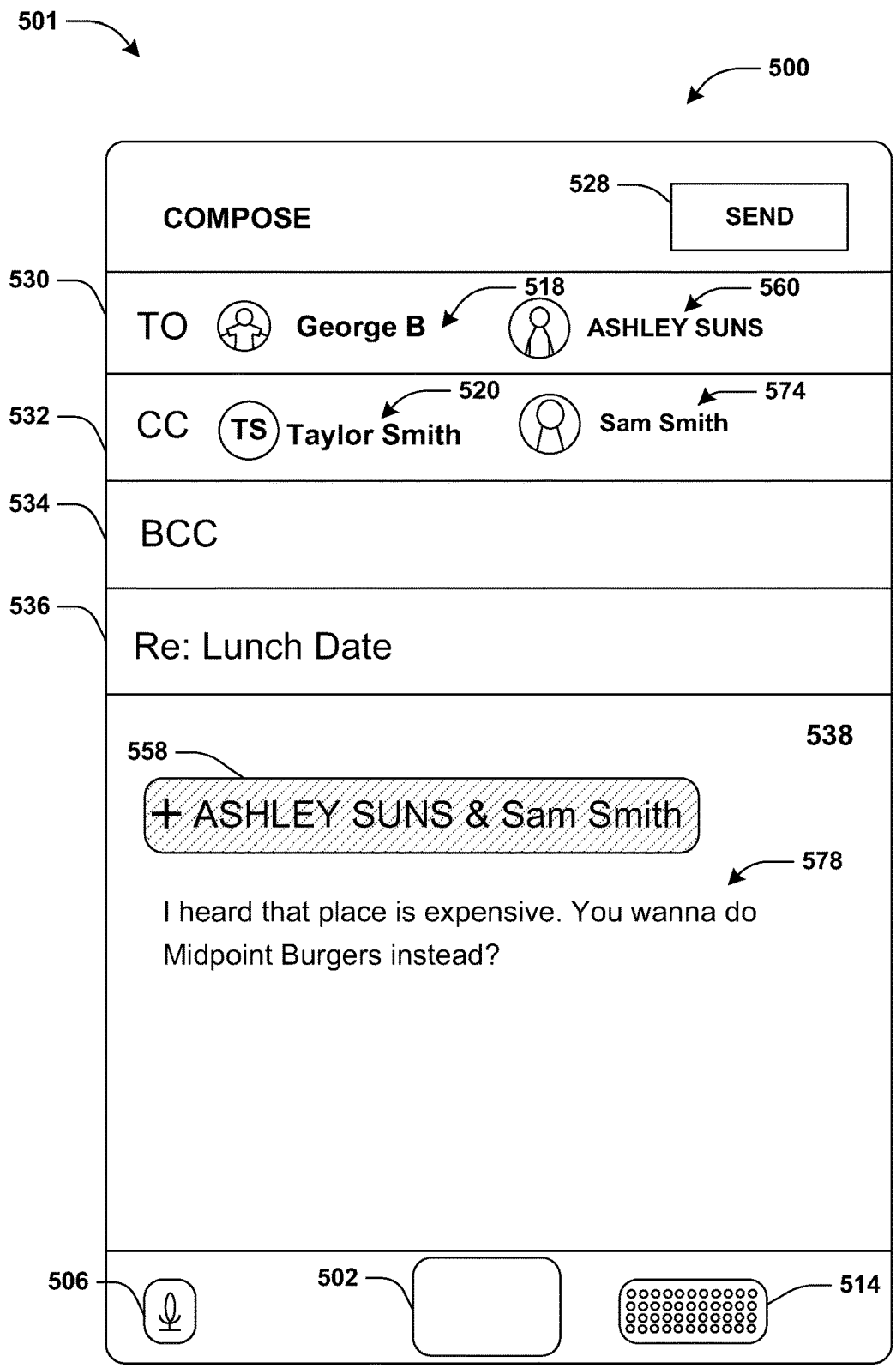
FIG. 5H is a component block diagram illustrating an example system for adding and/or removing recipients of email messages, where a fourth contact item, associated with a tenth user identification, is entered into one or more first input fields.

FIG. 5H illustrates a fourth contact item 574, associated with the tenth user identification, being entered into the one or more first input fields. For example, responsive to selecting the tenth user identification, the fourth contact item 574 may be entered into the fifth input field 532. In some examples, the fourth contact item 574 may comprise the tenth user identification and/or a tenth graphical object associated with the tenth contact. In some examples, the ninth user identification and/or a second symbol (e.g., "&") may be added to the third section 558. For example, the third section 558 may comprise "+ASHLEY SUNS & Sam Smith".

In some examples, message content data 578 corresponding to the body of the email message may be entered (e.g., by the user) into the third input field 538 via (e.g., the touchscreen, the one or more switches, the conversational interface, etc. of) the client device 500. In some examples, the message content data 578 may (e.g., automatically) be displayed below the third section 558. In some examples, the message content data 578 may be displayed in a second format. The second format may be different than the first format (e.g., of the third section 558). For example, one or more of a first font, a first text color, a first background color, a first background pattern, a first size, etc. of the third section 558 may be different than one or more of a second font, a second text color, a second background color, a second background pattern, a second size, etc. of the message content data 578.

In some examples, the email composition interface may comprise an eighth selectable input 528 corresponding to an option for sending (e.g., and/or transmitting) the email message to a first email address corresponding to the first contact item 518, a second email address corresponding to the second contact item 520, a third email address corresponding to the third contact item 560 and/or a fourth email address corresponding to the fourth contact item 574. For example, a selection of the eighth selectable input 528, corresponding to a second request to transmit the email message, may be received. Responsive to receiving the selection of the eighth selectable input 528, the email message may be transmitted to the first email address, the second email address, the third email address and the fourth email address.

FIGS. 6A-6D illustrate examples of a system 601 for adding and/or removing recipients of email messages (e.g., and/or different types of messages). A user, such as user Jessica, (e.g., and/or a client device 600 associated with the user) may access and/or interact with an email service (e.g., and/or a different type of messaging service) for sending and receiving email messages (e.g., and/or different types of messages). An email account of the user with the email service may be accessed and/or interacted with via one or more interfaces of an email client, a browser, an application, etc. on the client device 600. Accordingly, a graphical user interface (e.g., of the client device 600) may be controlled to display an email message (e.g., received via the email service).

Figure 6A:
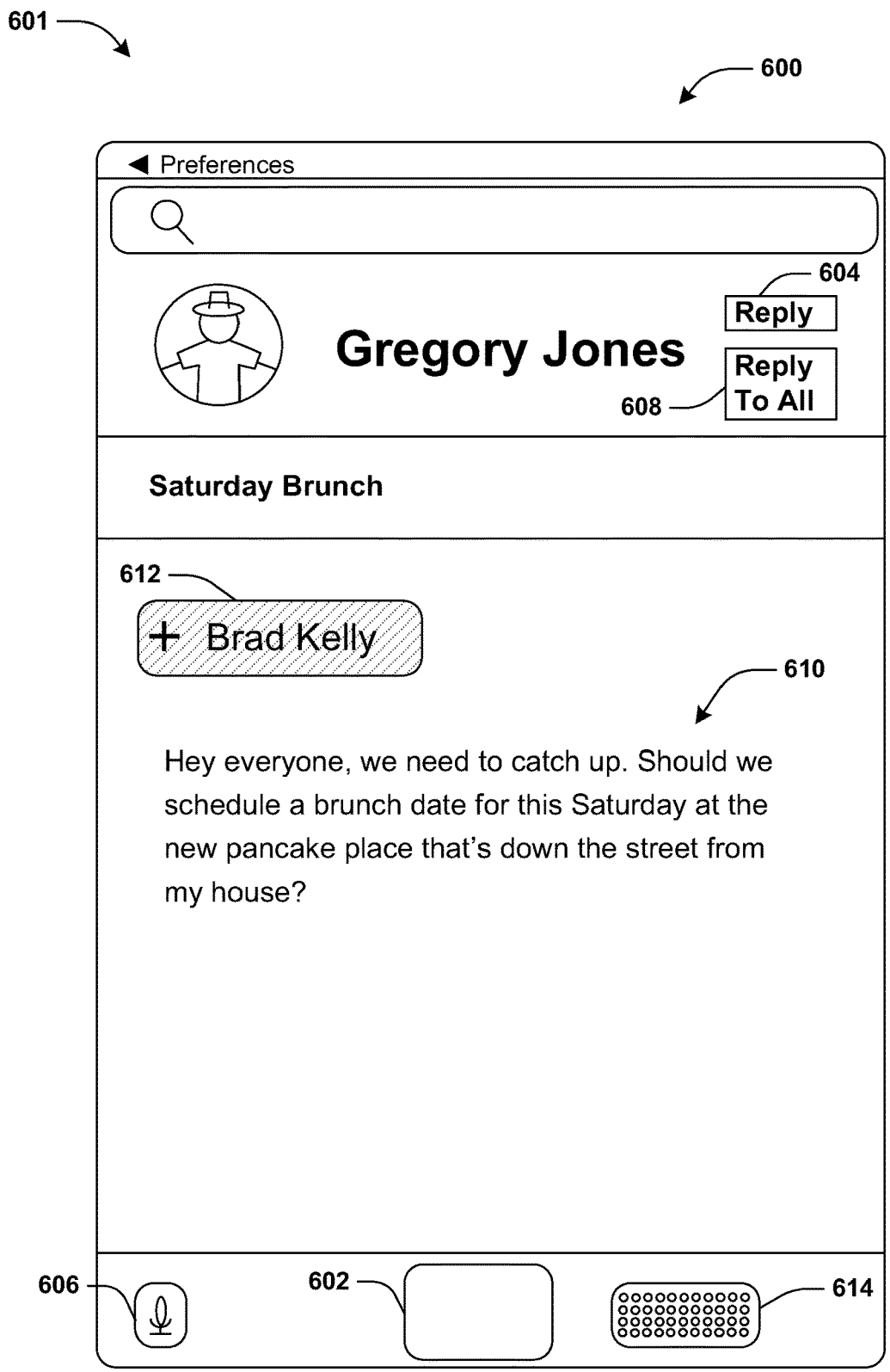
FIG. 6A is a component block diagram illustrating an example system for adding and/or removing recipients of email messages, where a graphical user interface of a client device is controlled to display an email message.

FIG. 6A illustrates the graphical user interface of the client device 600 being controlled to display the email message. The client device 600 may comprise a button 602, a microphone 606 and/or a speaker 614. In some examples, the graphical user interface may be controlled to display a first selectable input 604 and/or a second selectable input 608. For example, the first selectable input 604 may correspond to an option for responding to (e.g., and/or replying to) a sender of the email message. In some examples, the sender of the email message may correspond to a first user contact associated with a first user identification "Gregory Jones". Alternatively and/or additionally, the second selectable input 608 may correspond to an option for responding to (e.g., and/or replying to) the sender and one or more recipients (e.g., other than the user) of the email message.

In some examples, the email message may comprise message content data 610. In some examples, the email message may comprise a first section 612 (e.g., "changelog" section) comprising a first item comprising "+" and/or a second user identification comprising "Brad Kelly". The first section 612 may indicate that the second user identification was added to an email conversation (e.g., by the sender) of which the email message is a part. In some examples, the email message may not comprise the first section 612 (e.g., there may be no changelog associated with the email message).

In some examples, a selection of the second selectable input 608 may be received (e.g., via the client device 600). Responsive to receiving the selection of the second selectable input 608, the graphical user interface of the client device 600 may be controlled to display an email composition interface.

Figure 6B:
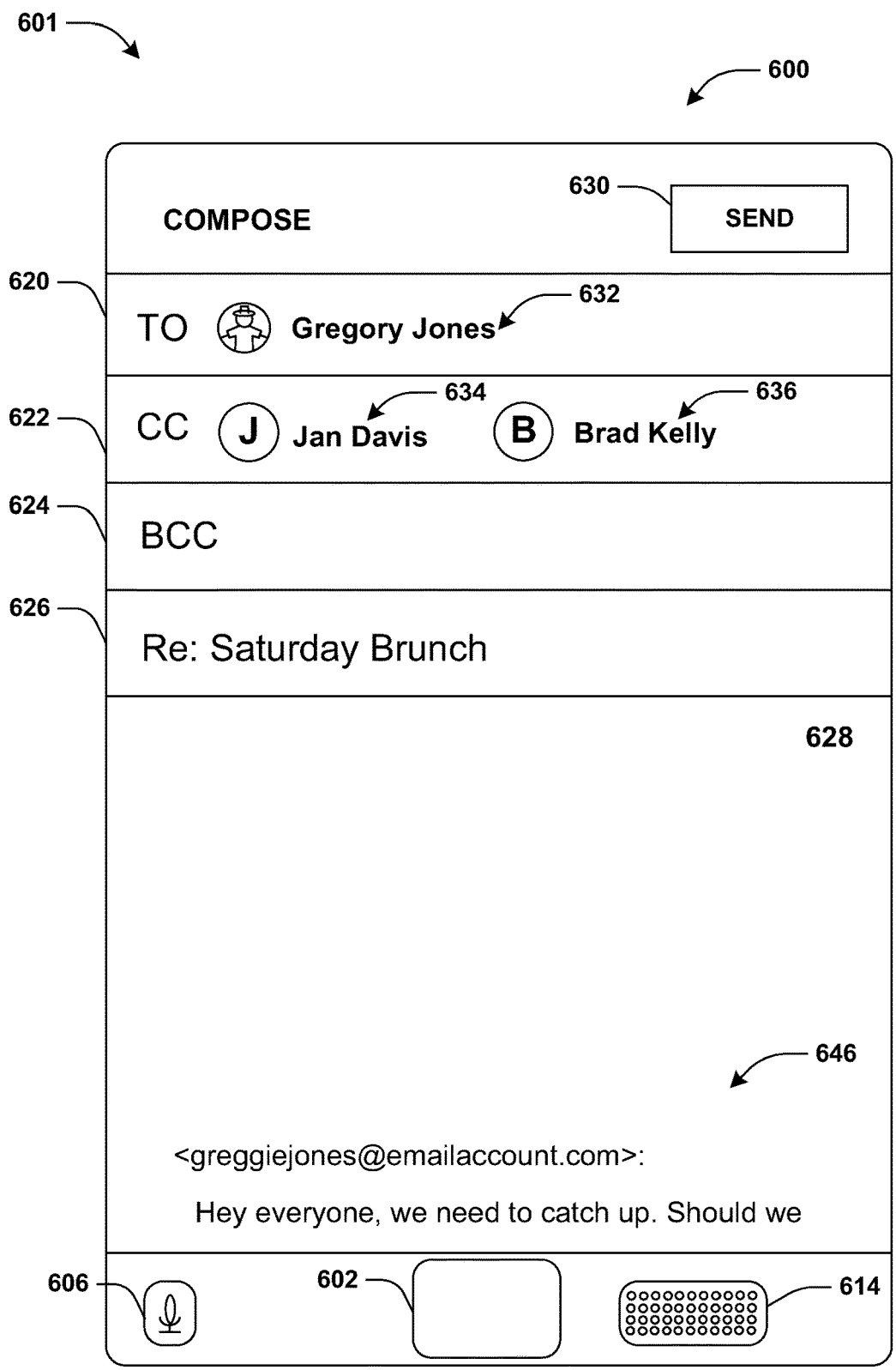
FIG. 6B is a component block diagram illustrating an example system for adding and/or removing recipients of email messages, where a graphical user interface of a client device is controlled to display an email composition interface.

FIG. 6B illustrates the graphical user interface of the client device 600 being controlled to display the email composition interface. In some examples, the email composition interface may comprise one or more first input fields corresponding to one or more recipients of a second email message, a second input field 626 corresponding to a subject of the second email message and/or a third input field 628 corresponding to a body of the second email message.

For example, the one or more first input fields may comprise a fourth input field 620 corresponding to one or more first recipients of the second email message. Alternatively and/or additionally, the one or more first input fields may comprise a fifth input field 622 corresponding to one or more second recipients of the second email message. In some examples, the one or more second recipients may comprise carbon copied (e.g., CC) recipients. Alternatively and/or additionally, the one or more first input fields may comprise a sixth input field 624 corresponding to one or more third recipients of the second email message. In some examples, the one or more third recipients may comprise blind carbon copied (e.g., BCC) recipients.

In some examples, a first contact item 632, comprising the first user identification and/or a first graphical object (e.g., profile picture), may be comprised within the fourth input field 620. Alternatively and/or additionally, a second contact item 636 may be comprised within the fifth input field 622. The second contact item 636 may comprise the second user identification associated with a second user contact and/or a second graphical object associated with the second user contact. Alternatively and/or additionally, a third contact item 634 may be comprised within the fifth input field 622. The third contact item 634 may comprise a third user identification "Jan Davis" associated with a third user contact and/or a third graphical object associated with the third user contact. In some examples, quoted text 646 corresponding to the email conversation may be comprised within the third input field 628. The quoted text 646 may comprise text from the email message.

Figure 6C:
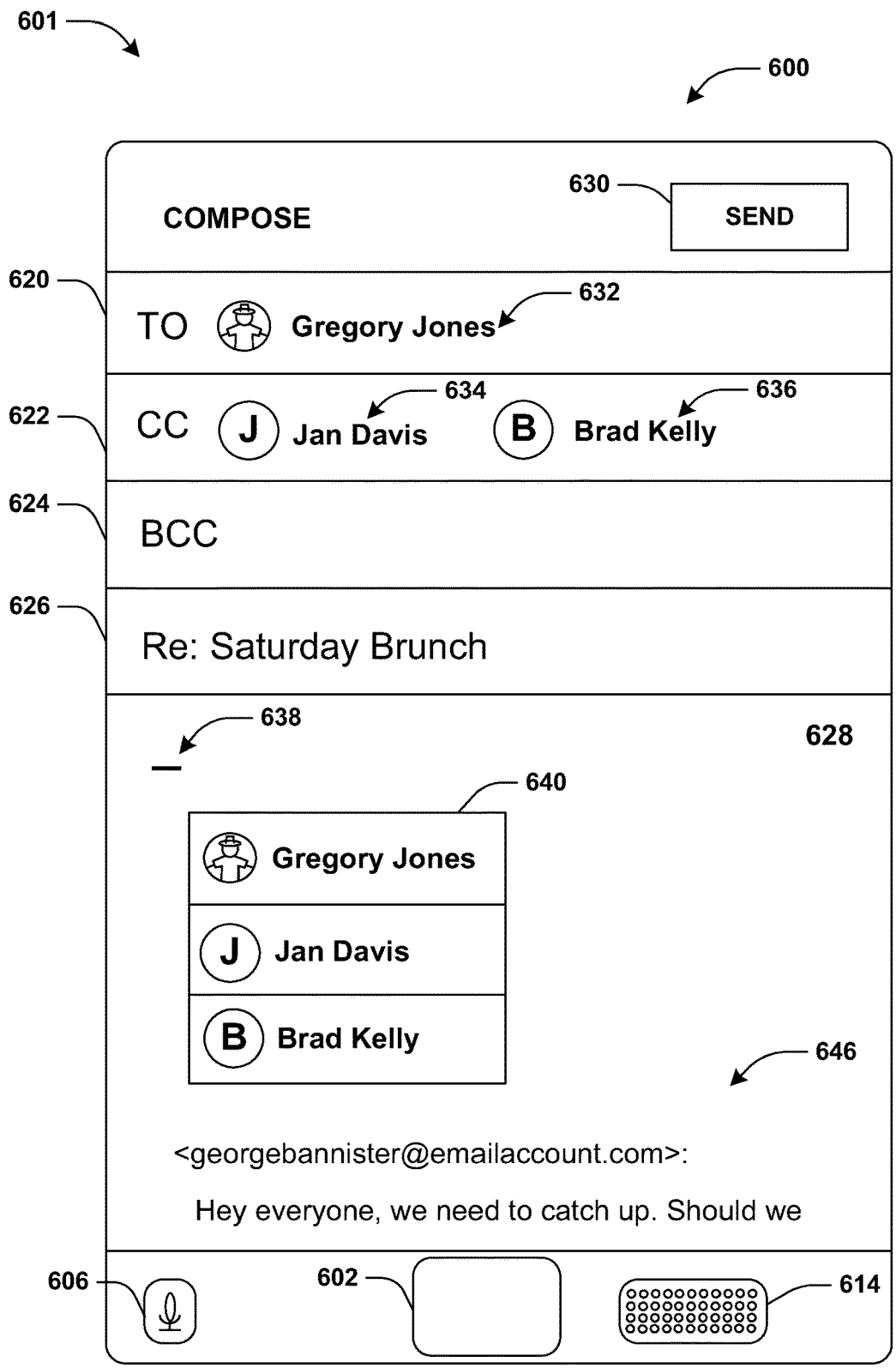
FIG. 6C is a component block diagram illustrating an example system for adding and/or removing recipients of email messages, where a trigger item is entered into a third input field.

FIG. 6C illustrates a trigger item 638 being entered into the third input field 628. In some examples, the trigger item 638 may be associated with removing one or more user identifications from the one or more first input fields. For example, the trigger item 638 may be entered into the third input field 628 by the user (e.g., via the client device 600). In some examples, the trigger item 638 may be entered into the third input field 538 using a touchscreen (e.g., of the client device 600), one or more switches (e.g., one or more buttons), a conversational interface (e.g., a voice recognition and natural language interface), etc. In some examples, the trigger item 638 may comprise a symbol (e.g., "−").

In some examples, the trigger item 638 may be detected (e.g., by the client device 600) in the third input field 628. Responsive to detecting the trigger item 638, the one or more first input fields may be analyzed to generate a list of user identifications 640. For example, the list of user identifications 640 may comprise a third selectable input corresponding to the first user contact, a fourth selectable input corresponding to the third user contact and/or a fifth selectable input corresponding to the second user contact. The third selectable input may comprise the first user identification and/or the first graphical object. Alternatively and/or additionally, the fourth selectable input may comprise the third user identification and/or the third graphical object. Alternatively and/or additionally, the fifth selectable input may comprise the second user identification and/or the second graphical object.

In some examples, the second user identification may be selected by receiving a selection of the second user identification from the list of user identifications 640. For example, the fifth selectable input (e.g., corresponding to the second user identification) may be selected via (e.g., the touchscreen, the one or more switches, the conversational interface, etc. of) the client device 600.

Figure 6D:
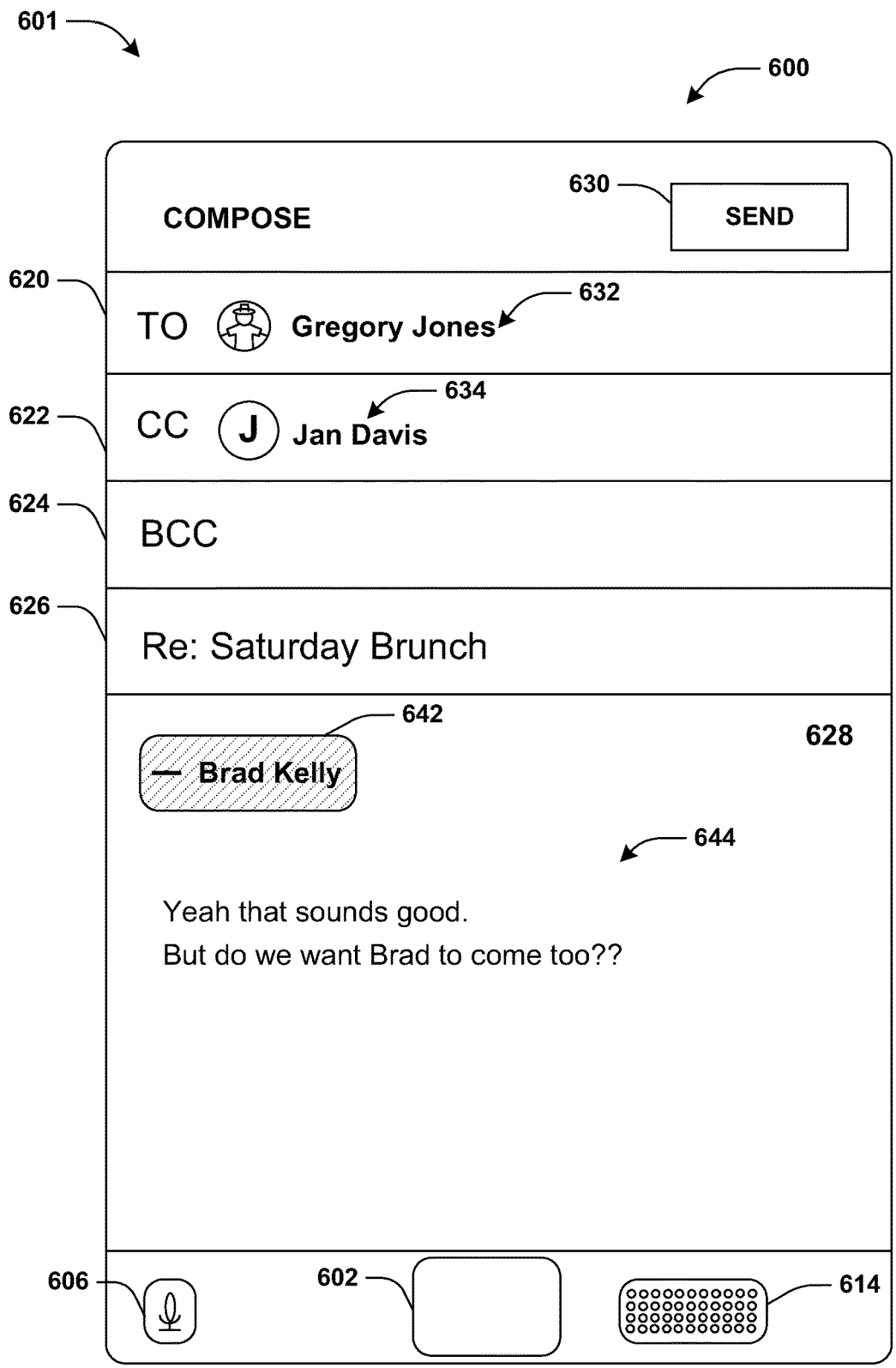
FIG. 6D is a component block diagram illustrating an example system for adding and/or removing recipients of email messages, where a second contact item is removed from one or more first input fields.

FIG. 6D illustrates the second contact item 636 being removed from the one or more first input fields. For example, responsive to selecting the second user identification, the second contact item 636 may (e.g., automatically) be removed from the fifth input field 622. In some examples, the trigger item 638 and/or the second user identification may be comprised within a second section 642 (e.g., "changelog" section) of the third input field 628. In some examples, the second section 642 may comprise the trigger item 638 and/or the second user identification in a first format.

In some examples, second message content data 644 corresponding to the body of the second email message may be entered (e.g., by the user) into the third input field 628 via (e.g., the touchscreen, the one or more switches, the conversational interface, etc. of) the client device 600. In some examples, the second message content data 644 may (e.g., automatically) be displayed below the second section 642. In some examples, the second message content data 644 may be displayed in a second format. The second format may be different than the first format (e.g., of the first section 642). For example, one or more of a first font, a first text color, a first background color, a first background pattern, a first size, etc. of the second section 642 may be different than one or more of a second font, a second text color, a second background color, a second background pattern, a second size, etc. of the second message content data 644.

In some examples, the email composition interface may comprise a sixth selectable input 630 corresponding to an option for sending (e.g., and/or transmitting) the second email message to a first email address corresponding to the first contact item 632 and/or a second email address corresponding to the third contact item 634. For example, a selection of the sixth selectable input 630 may be received. Responsive to receiving the selection of the sixth selectable input 630, the second email message may be transmitted to the first email address and the second email address.

It may be appreciated that the disclosed subject matter may assist a user (e.g., and/or a client device associated with the user) in adding and/or removing recipients of messages and/or transmitting messages to intended recipients.

Implementation of at least some of the disclosed subject matter may lead to benefits including, but not limited to, a reduction in screen space and/or an improved usability of a display (e.g., of the client device) (e.g., as a result of enabling the user to automatically add a recipient to one or more first input fields, corresponding to one or more recipients of a message, by entering a trigger item into a second input field corresponding to a body of the message, as a result of enabling the user to automatically remove a second recipient from the one or more first input fields by entering a second trigger item into the second input field, etc.).

Alternatively and/or additionally, implementation of at least some of the disclosed subject matter may lead to benefits including more accurate and precise transmission of messages to intended recipients (e.g., as a result of detecting a trigger item and/or a user identification in the second input field, as a result of automatically adding a contact item associated with the user identification to the one or more first input fields, as a result of detecting a second trigger item and/or a second user identification in the third input field, as a result of automatically removing a second contact item from the one or more first input fields, etc.).

Alternatively and/or additionally, implementation of at least some of the disclosed subject matter may lead to benefits including assisting a second user that is a recipient of the message to develop an understanding of and/or determine a significance of the message (e.g., as a result of the message comprising a first section comprising recipients added to a messaging conversation, as a result of the message comprising a second section comprising recipients removed from a messaging conversation, as a result of displaying the first section and/or the second section above message content data of the message, as a result of a first format of the first section and/or a second format of the second section being different than a second format of the message content data, etc.).

Alternatively and/or additionally, implementation of at least some of the disclosed subject matter may lead to benefits including a reduction in bandwidth (e.g., as a result of reducing a need for the user to resend the message to one or more intended recipients of the message that were accidentally and/or unintentionally not entered into the one or more first input fields).

In some examples, at least some of the disclosed subject matter may be implemented on a client device, and in some examples, at least some of the disclosed subject matter may be implemented on a server (e.g., hosting a service accessible via a network, such as the Internet).

Figure 7:
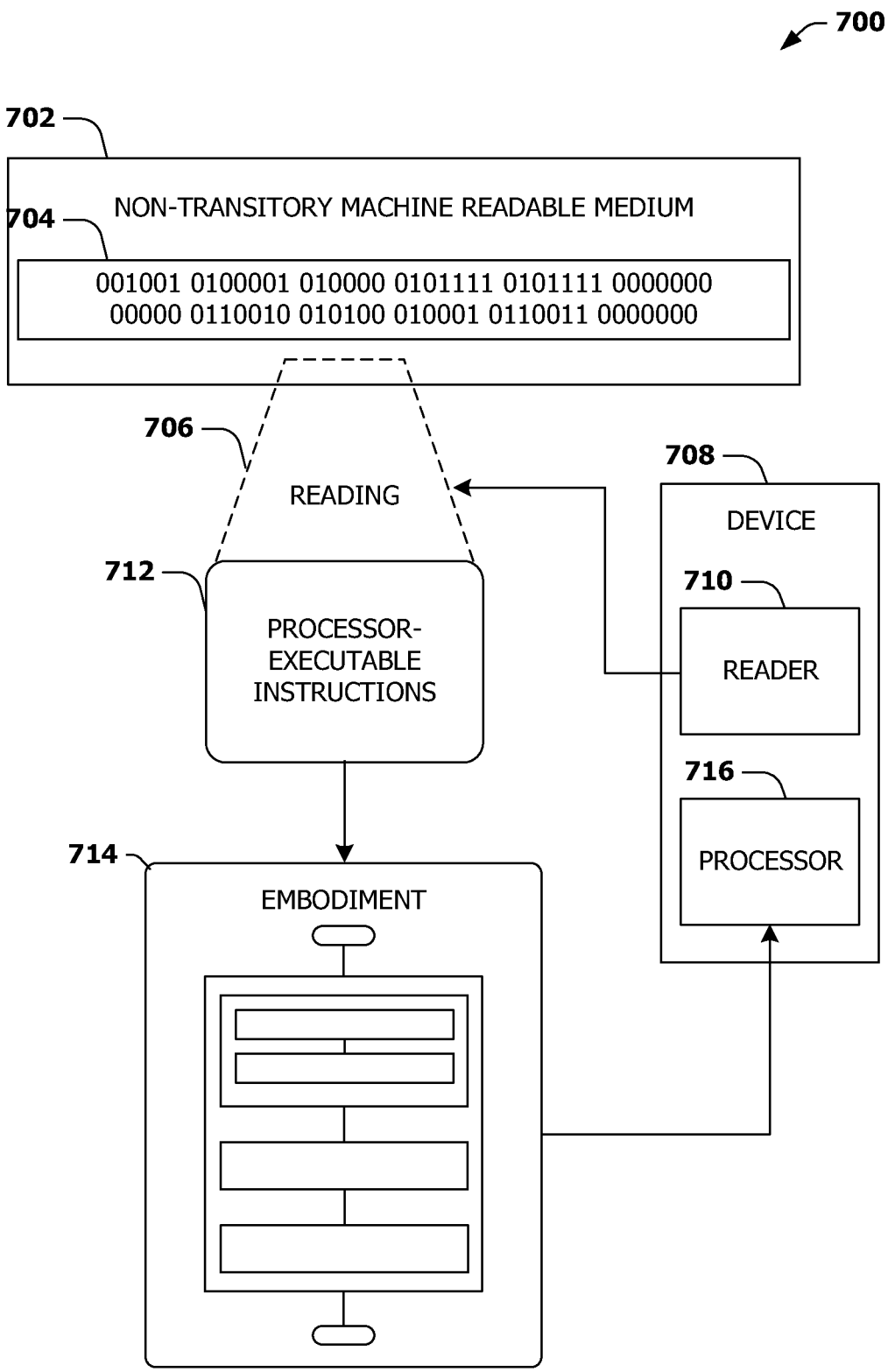
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIGS. 4A-4B, for example. In some embodiments, the processor-executable instructions 712 are configured to cause implementation of a system, such as at least some of the example system 501 of FIGS. 5A-5H, and/or the example system 601 of FIGS. 6A-6D, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:
1. A method, comprising:
controlling a graphical user interface to display an email interface;

receiving a first request to compose an email message via the email interface;
responsive to receiving the first request, controlling the graphical user interface to display an email composition interface comprising one or more first input fields corresponding to one or more recipients of the email message and a second input field corresponding to a body of the email message;
detecting a trigger item in the second input field;
responsive to detecting the trigger item, analyzing a user database to generate a list of user identifications;
controlling the graphical user interface to display the list of user identifications;
monitoring for one or more content items in the second input field following the trigger item;
detecting a first content item in the second input field following the trigger item;
responsive to detecting the first content item, analyzing the user database to generate a second list of user identifications based upon the first content item;
controlling the graphical user interface to display the second list of user identifications;
selecting a first user identification by at least one of receiving a selection of the first user identification from the second list of user identifications or detecting the first user identification in the second input field;
responsive to selecting the first user identification, entering a first contact item associated with the first user identification into the one or more first input fields;
selecting a second user identification by at least one of receiving a selection of the second user identification from a third list of user identifications associated with the one or more first input fields or detecting a second contact item associated with the second user identification in the one or more first input fields;
responsive to detecting the second contact item in the one or more first input fields, updating the second input field to comprise a representation of the first user identification and a representation of the second user identification;
receiving a second request to transmit the email message;
responsive to receiving the second request, controlling the graphical user interface to display a first selectable input corresponding to a first representation of the email message and a second selectable input corresponding to a second representation of the email message; and
at least one of:
responsive to receiving a selection of the first selectable input, transmitting the first representation of the email message, comprising the trigger item and the first user identification within the body of the email message, to one or more email addresses identified by the one or more first input fields; or
responsive to receiving a selection of the second selectable input, transmitting the second representation of the email message, without the trigger item and the first user identification comprised within the body of the email message, to the one or more email addresses identified by the one or more first input fields.

2. The method of claim 1, wherein message content data corresponding to the body of the email message is in the second input field, the method comprising:
displaying the trigger item and the first user identification in the second input field; and
displaying the message content data, below the first user identification, in the second input field.

3. The method of claim 2,
the trigger item and the first user identification displayed in a first format; and
the message content data displayed in a second format, different than the first format.

4. The method of claim 1, comprising:
selecting the second user identification by receiving the selection of the second user identification from the third list of user identifications associated with the one or more first input fields.

5. The method of claim 1, comprising:
responsive to receiving the selection of the first selectable input, transmitting the first representation of the email message comprising the trigger item and the first user identification within the body of the email message.

6. The method of claim 1, comprising:
responsive to receiving the selection of the second selectable input, transmitting the second representation of the email message without the trigger item and the first user identification comprised within the body of the email message.

7. The method of claim 1, comprising:
selecting the second user identification by detecting the second contact item associated with the second user identification in the one or more first input fields.

8. The method of claim 2, comprising:
detecting a removal of a third user identification from the one or more first input fields; and
responsive to detecting the removal of the third user identification from the one or more first input fields:
entering an item into the second input field; and
entering the third user identification into the second input field, wherein the third user identification is adjacent to the item.

9. The method of claim 3, comprising:
detecting a removal of a third user identification from the one or more first input fields; and
responsive to detecting the removal of the third user identification from the one or more first input fields, entering the third user identification into the second input field, wherein the third user identification is displayed in a third format, different than the first format.

10. The method of claim 1, comprising:
detecting a second trigger item in the second input field;
responsive to detecting the second trigger item, analyzing the one or more first input fields to generate a fourth list of user identifications;
controlling the graphical user interface to display the fourth list of user identifications;
selecting a third user identification by at least one of receiving a selection of the third user identification from the fourth list of user identifications or detecting the third user identification in the second input field; and
responsive to selecting the third user identification, removing a third contact item associated with the third user identification from the one or more first input fields.

11. The method of claim 10, wherein the trigger item is associated with adding one or more user identifications to the one or more first input fields and the second trigger item is associated with removing one or more user identifications from the one or more first input fields.

12. The method of claim 1, wherein the trigger item is a symbol.

13. The method of claim 1, wherein the trigger item is a set of characters matching at least a portion of a content item in the user database.

14. A computing device comprising:
a processor; and
memory comprising processor-executable instructions that when executed by the processor cause performance of operations, the operations comprising:
controlling a graphical user interface to display a messaging interface comprising one or more first input fields corresponding to one or more recipients of a message and a second input field corresponding to a body of the message;
detecting a trigger item in the second input field;
responsive to detecting the trigger item, analyzing the one or more first input fields to generate a list of user identifications;
controlling the graphical user interface to display the list of user identifications;
selecting a first user identification by at least one of receiving a selection of the first user identification from the list of user identifications or detecting the first user identification in the second input field;
responsive to selecting the first user identification, removing a first contact item associated with the first user identification from the one or more first input fields;
receiving a request to transmit the message;
responsive to receiving the request, controlling the graphical user interface to display a first selectable input corresponding to a first representation of the message and a second selectable input corresponding to a second representation of the message; and
at least one of:
responsive to receiving a selection of the first selectable input, transmitting the first representation of the message, comprising the trigger item and the first user identification within the body of the message, to one or more addresses identified by the one or more first input fields; or
responsive to receiving a selection of the second selectable input, transmitting the second representation of the message, without the trigger item and the first user identification comprised within the body of the message, to the one or more addresses identified by the one or more first input fields.

15. The computing device of claim 14, wherein message content data corresponding to the body of the message is in the second input field, the operations comprising:
displaying the trigger item and the first user identification in the second input field; and
displaying the message content data, below the first user identification, in the second input field.

16. The computing device of claim 15,
the trigger item and the first user identification displayed in a first format; and
the message content data displayed in a second format, different than the first format.

17. The computing device of claim 14, wherein the trigger item is associated with removing one or more user identifications from the one or more first input fields.

18. A non-transitory machine readable medium having stored thereon processor-executable instructions that when executed cause performance of operations, the operations comprising:
controlling a graphical user interface to display a messaging interface comprising one or more first input fields corresponding to one or more recipients of a message and a second input field corresponding to a body of the message;
detecting a trigger item in the second input field;
responsive to detecting the trigger item, analyzing a user database to generate a list of user identifications;
controlling the graphical user interface to display the list of user identifications;
selecting a first user identification by at least one of receiving a selection of the first user identification from the list of user identifications or detecting the first user identification in the second input field;
responsive to selecting the first user identification, entering a first contact item associated with the first user identification into the one or more first input fields;
selecting a second user identification by at least one of receiving a selection of the second user identification from a second list of user identifications associated with the one or more first input fields or detecting a second contact item associated with the second user identification in the one or more first input fields;
responsive to detecting the second contact item in the one or more first input fields, updating the second input field to comprise a representation of the first user identification and a representation of the second user identification;
receiving a request to transmit the message; and
responsive to receiving the request, transmitting the message to one or more messaging accounts identified by the one or more first input fields.

19. The non-transitory machine readable medium of claim 18, wherein message content data corresponding to the body of the message is in the second input field, the operations comprising:
displaying the trigger item and the first user identification in the second input field; and
displaying the message content data, below the first user identification, in the second input field.

20. The non-transitory machine readable medium of claim 19, the operations comprising:
the trigger item and the first user identification displayed in a first format; and
the message content data displayed in a second format, different than the first format.

* * * * *